(12) United States Patent
Hu

(10) Patent No.: US 12,284,373 B2
(45) Date of Patent: Apr. 22, 2025

(54) DATA PROCESSING METHOD, APPARATUS, AND DEVICE FOR NON-SEQUENTIAL POINT CLOUD MEDIA

(71) Applicant: TENCENT TECHNOLOGY (SHENZHEN) COMPANY LIMITED, Shenzhen (CN)

(72) Inventor: Ying Hu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 257 days.

(21) Appl. No.: 17/980,056

(22) Filed: Nov. 3, 2022

(65) Prior Publication Data

US 2023/0062933 A1 Mar. 2, 2023

Related U.S. Application Data

(63) Continuation of application No. PCT/CN2022/075510, filed on Feb. 8, 2022.

(30) Foreign Application Priority Data

Feb. 22, 2021 (CN) .......................... 202110197827.6

(51) Int. Cl.
 *H04N 19/42* (2014.01)
 *H04N 19/167* (2014.01)

(52) U.S. Cl.
 CPC ........... *H04N 19/42* (2014.11); *H04N 19/167* (2014.11)

(58) Field of Classification Search
 None
 See application file for complete search history.

(56) References Cited

U.S. PATENT DOCUMENTS

| 10,404,411 B2 | 9/2019 | Chen et al. |
| 10,542,297 B2 | 1/2020 | Chen et al. |

(Continued)

FOREIGN PATENT DOCUMENTS

WO 2020189895 A1 9/2020

OTHER PUBLICATIONS

The World Intellectual Property Organization (WIPO) International Search Report for PCT/CN2022/075510 Apr. 22, 2022 6 Pages (including translation).

(Continued)

*Primary Examiner* — Edward Martello
(74) *Attorney, Agent, or Firm* — ANOVA LAW GROUP, PLLC

(57) ABSTRACT

A data processing method for non-sequential point cloud media includes: acquiring property information of a viewing region corresponding to non-sequential point cloud media; and presenting the non-sequential point cloud media based on the property information of the viewing region corresponding to the non-sequential point cloud media. By introducing first indication information into the property information of the viewing region corresponding to the non-sequential point cloud media, when indicating that a recommended viewing region exists for the non-sequential point cloud media, the presentation of the corresponding non-sequential point cloud media according to property information of the recommended viewing region in the property information of the viewing region can be supported on the basis of an encapsulation structure of the non-sequential point cloud media.

20 Claims, 7 Drawing Sheets

(56) References Cited

U.S. PATENT DOCUMENTS

| | | | |
|---|---|---|---|
| 10,623,635 B2 | 4/2020 | Wang et al. | |
| 10,742,999 B2 | 8/2020 | Wang et al. | |
| 10,805,620 B2 | 10/2020 | Wang et al. | |
| 10,820,025 B2 | 10/2020 | Lai et al. | |
| 10,924,820 B2 | 2/2021 | Chen et al. | |
| 10,951,874 B2 | 3/2021 | Chen et al. | |
| 11,139,000 B2 | 10/2021 | Wang et al. | |
| 11,197,040 B2 | 12/2021 | Wang et al. | |
| 2018/0075576 A1 | 3/2018 | Liu et al. | |
| 2019/0019218 A1 | 1/2019 | Thompson et al. | |
| 2019/0318488 A1* | 10/2019 | Lim | H04N 21/85406 |
| 2020/0228780 A1* | 7/2020 | Kim | H04N 13/117 |
| 2020/0382764 A1 | 12/2020 | Oyman et al. | |
| 2021/0105313 A1* | 4/2021 | Wang | H04L 65/70 |
| 2022/0159261 A1 | 5/2022 | Oh | |

OTHER PUBLICATIONS

Shuai Zhao et al., "Study of User QoE Improvement for Dynamic Adaptive Streaming Over HTTP (MPEG-DASH)", 2017, pp. 566-570. International Conference on Networking and Communications (ICNC).

Xiang Zhang et al., "Linear Model based Geometry Coding for Lidar Acquired Point Clouds", 2020, pp. 406-406. 2020 Data Compression Conference (DCC), Snowbird, UT, USA.

Min Zhang et al., "PointHop: An Explainable Machine Learning Method for Point Cloud Classification", 2000, IEEE TMM.

Li Li et al., "Occupancy-Map-Based Rate Distortion Optimization for Video-Based Point Cloud Compression", 2019, ICIP.

Li Li et al., "Occupancy-map-based Rate Distortion Optimization and Partition for Video-based Point Cloud Compression", 2020, IEEE TCSVT.

Li Li et al., "Video-based compression for plenoptic point clouds", arXiv:1911.01355.

Li Li et al ., "$\lambda$-domain Perceptual Rate Control for 360-degree Video Compression", 2020, IEEE Journal on Selected Topics in Signal Processing.

Li Li et al ., "Rate Control for Video-based Point Cloud Compression", 2020, IEEE TIP.

Li Li et al ., "Efficient Projected Frame Padding for Video-based Point Cloud Compression", 2019, IEEE TMM.

Min Zhang et al., "Unsupervised Feedforward Feature (UFF) Learning for Point Cloud Classification and Segmentation", Dec. 1-4, 2020, 2020 IEEE International Conference on Visual Communications and Image Processing (VCIP),Macau.

Pranav Kadam et al., "Unsupervised Point Cloud Registration via Salient Points Analysis (SPA)", Dec. 1-4, 2020, 2020 IEEE International Conference on Visual Communications and Image Processing (VCIP), Macau.

Sejin Oh et al., "Draft text of ISO/IEC FDIS 23090-18 Carriage of Geometry-based Point Cloud Compression Data", ISO/IEC JTC 1/SC 29/WG 03 N0311.

"Information technology—Coding of audio-visual objects—Part 12: ISO base media file format", Sep. 2022, ISO/IEC JTC 1/SC 29/WG 11.

* cited by examiner

DATA PROCESSING METHOD, APPARATUS, AND DEVICE FOR NON-SEQUENTIAL POINT CLOUD MEDIA

RELATED APPLICATION(S)

This application is a continuation application of PCT Patent Application PCT/CN2022/075510 filed on Feb. 8, 2022, which claims priority to Chinese Patent Application No. 2021101978276, entitled "DATA PROCESSING METHOD, APPARATUS, AND DEVICE FOR NON-SEQUENTIAL POINT CLOUD MEDIA" and filed with the China National Intellectual Property Administration on Feb. 22, 2021, all of which are incorporated herein by reference in entirety.

FIELD OF THE TECHNOLOGY

The present disclosure relates to the field of computer vision (image) technologies for artificial intelligence, in particular to the field of non-sequential point cloud media technologies, and more particularly, to a data processing method, apparatus, and device for non-sequential point cloud media.

BACKGROUND

With the continuous development of science and technology, high-precision point cloud data can be obtained at a relatively low cost and in a relatively short time period, and the point cloud data is often transmitted between a content production device and a content consumption device in the form of point cloud media.

A transmission process of the point cloud media is as follows: After encoding the point cloud media, the content production device encapsulates the encoded point cloud media to obtain an encapsulated file of the point cloud media, and transmits the encapsulated file of the point cloud media to the content consumption device. The content consumption device decapsulates the encapsulated file of the point cloud media transmitted by the content production device, and decodes the point cloud media. Finally, the content consumption device presents a media file of the point cloud media. Because the amount of point cloud data contained in the point cloud media is relatively large, how to improve the phasing processing efficiency of the point cloud media is a problem that the industry has been continuously solving.

SUMMARY

The present disclosure provides a data processing method, apparatus, and device for non-sequential point cloud media.

In one aspect, the present disclosure provides a data processing method for non-sequential point cloud media, applied to a computing device, the method including: acquiring property information of a viewing region corresponding to non-sequential point cloud media, the property information of the viewing region corresponding to the non-sequential point cloud media including first indication information, and the first indication information being used for indicating whether a recommended viewing region exists for the non-sequential point cloud media; and in response to a determination that the first indication information indicates that the recommended viewing region exists for the non-sequential point cloud media, presenting the non-sequential point cloud media located in the recommended viewing region based on property information of the recommended viewing region included in the property information of the viewing region.

In another aspect, the present disclosure provides a data processing method for non-sequential point cloud media, applied to a computing device, the method including: generating property information of a viewing region corresponding to non-sequential point cloud media, the property information of the viewing region corresponding to the non-sequential point cloud media including first indication information, and the first indication information being used for indicating whether a recommended viewing region exists for the non-sequential point cloud media; and configuring a dynamic adaptive streaming over HTTP (DASH) signaling message of the non-sequential point cloud media and a property information box of the non-sequential point cloud media based on the property information of the viewing region corresponding to the non-sequential point cloud media, in response to a determination that the first indication information indicates that the recommended viewing region exists for the non-sequential point cloud media, the property information of the viewing region including property information of the recommended viewing region.

In yet another aspect, the present disclosure provides a data processing apparatus for non-sequential point cloud media, including: a memory storing computer program instructions; and a processor coupled to the memory and configured to execute the computer program instructions and perform: acquiring property information of a viewing region corresponding to non-sequential point cloud media, the property information of the viewing region corresponding to the non-sequential point cloud media including first indication information, and the first indication information being used for indicating whether a recommended viewing region exists for the non-sequential point cloud media; and in response to a determination that the first indication information indicates that the recommended viewing region exists for the non-sequential point cloud media, presenting the non-sequential point cloud media located in the recommended viewing region based on property information of the recommended viewing region included in the property information of the viewing region.

In yet another aspect, the present disclosure provides one or more computer-readable storage mediums, storing computer-readable instructions, the computer-readable instructions, when read and executed by one or more processors of a computing device, implementing the method in the embodiments of the present disclosure.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

Figure 1:
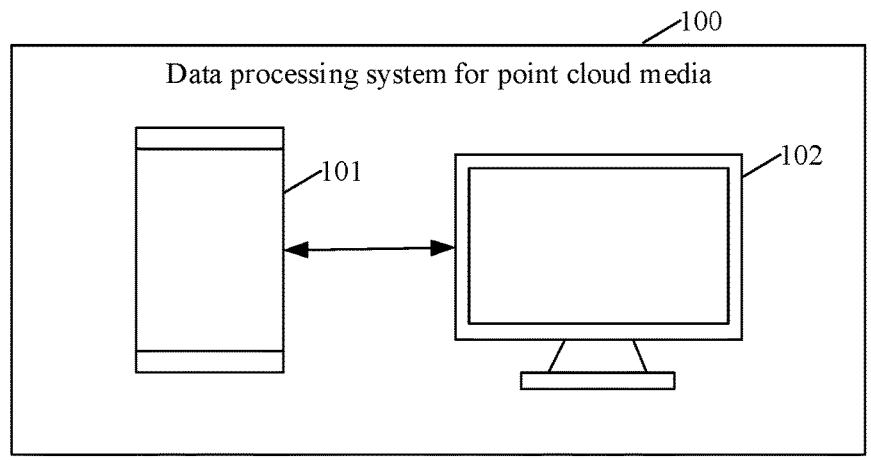
FIG. 1 is a schematic block diagram of a data processing system for point cloud media according to certain embodiment(s) of the present disclosure.

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

When and as applicable, the term "an embodiment," "one embodiment," "some embodiment(s), "some embodiments," "certain embodiment(s)," or "certain embodiments" may refer to one or more subsets of all possible embodiments. When and as applicable, the term "an embodiment," "one embodiment," "some embodiment(s), "some embodiments," "certain embodiment(s)," or "certain embodiments" may refer to the same subset or different subsets of all the possible embodiments, and can be combined with each other without conflict.

In certain embodiments, the term "based on" is employed herein interchangeably with the term "according to."

The solution provided in the present disclosure may relate to artificial intelligence technology, and particularly, to computer vision technology in artificial intelligence technology. For example, the technology related to data processing of point cloud media in the computer vision technology is used.

Relevant concepts of point cloud are described below.

Point cloud is a set of discrete points that are randomly distributed and express a spatial structure and surface property of a three-dimensional object or three-dimensional scene.

Point cloud data is a specific recording form of the point cloud. The point cloud data of each point in the point cloud may include geometry information and property information. The geometry information of each point in the point cloud refers to Cartesian three-dimensional coordinate data of the point. The property information of each point in the point cloud may include, but is not limited to, at least one of the following: color information, material information, and laser reflectance information. The color information may be information of any one of color spaces. For example, the color information may be Red Green Blue (RGB) information. In another example, the color information may alternatively be luminance chrominance (YcbCr, YUV) information. Y represents luma, Cb (U) represents blue color difference, Cr (V) represents red, U and V represent chroma, and chroma is used for describing color difference information.

Each point in the point cloud has the same amount of property information. For example, each point in the point cloud has two types of property information, namely color information and laser reflectance information. In another example, each point in the point cloud has three types of property information, namely color information, material information, and laser reflectance information. In an encapsulation process of point cloud media, the geometry information of the point may also be referred to as the geometry weight or geometry component of the point cloud media, and the property information of the point may also be referred to as the property weight or property component of the point cloud media. The point cloud media may include one geometry component and one or more property components.

Based on an implementation scenario, the point cloud may be divided into two categories, namely machine-perceived point cloud and human-eye-perceived point cloud. Implementation scenarios of the machine-perceived point cloud include, but are not limited to: autonomous navigation system, real-time inspection system, geographic information system, visual sorting robot, rescue and disaster relief robot, and other point cloud implementation scenarios. Implementation scenarios of the human-eye-perceived point cloud include, but are not limited to: digital cultural heritage, free viewpoint broadcasting, three-dimensional immersion communication, three-dimensional immersion interaction, and other point cloud implementation scenarios. The way to acquire the point cloud includes, but is not limited to: computer generation, 3D laser scanning, 3D photographic measurement, and the like. A computer may generate a point cloud of a virtual three-dimensional object and scene. 3D scanning may acquire a point cloud of a static real-world three-dimensional object or scene, and may acquire millions of point clouds per second. 3D cameras may acquire a point cloud of a dynamic real-world three-dimensional object or scene, and may acquire tens of millions of point clouds per second. In certain embodiment(s), a point cloud on a surface of an object may be collected through photovoltaic radar, laser radar, laser scanner, multi-view camera, or other collection devices. A point cloud obtained according to a laser measurement principle may include three-dimensional coordinate information of the point and laser reflectance of the point. A point cloud obtained according to the photographic measurement principle may include three-dimensional coordinate information of the point and color information of the point. The point cloud obtained combining laser measurement principle and the photographic measurement principle may include the three-dimensional coordinate information of the point, the laser reflectance of the point, and the color information of the point. Correspondingly, the point cloud may alternatively be divided into three types based on the acquisition way of the point cloud, namely a first static point cloud, a second type of dynamic point cloud, and a third type of dynamically-acquired point cloud. For the first static point cloud, the object is stationary, and the device for acquiring the point cloud is also stationary. For the second type of dynamic point cloud, the object is moving, but the device for acquiring the point cloud is stationary. For the third type of dynamically-acquired point cloud, the device for acquiring the point cloud is moving.

For example, in the medical field, a point cloud of biological tissue organs may be obtained through magnetic resonance imaging (MM), computed tomography (CT), and electromagnetic localization information. These technologies reduce point cloud acquisition costs and time cycles, and increase data accuracy. The change in the acquisition manner of the point cloud makes it possible to acquire a large number of point clouds. With the accumulation of large-scale point clouds, efficient storage, transmission, publishing, sharing, and standardization of the point cloud become the key of point cloud application.

The point cloud data may be used to form point cloud media, and the point cloud media may be a media file. The point cloud media may include a plurality of media frames, and each media frame in the point cloud media consists of the point cloud data. The point cloud media is widely used as it can express a spatial structure and surface property of a three-dimensional object or a three-dimensional scene in a flexible and convenient way. After encoding the point cloud media, an encoded bitstream may be encapsulated into an encapsulated file, which may be used for transmission to the user. Correspondingly, at a point cloud media player terminal, the encapsulated file may be decapsulated and is decoded, and finally decoded data flow is presented. The encapsulated file may also be referred to as a point cloud file.

The point cloud may be encoded through a point cloud encoding framework.

The point cloud encoding framework may be a geometry point cloud compression (G-PCC) encoding and decoding framework or a video point cloud compression (V-PCC) encoding and decoding framework provided by the moving picture experts group (MPEG), or may be an AVS-PCC encoding and decoding framework provided by the audio video standard (AVS). The G-PCC encoding and decoding framework may be used for compression for the first static point cloud and the third type of dynamically-acquired point cloud, and the V-PCC encoding and decoding framework may be used for compression for the second type of dynamic point cloud. The G-PCC encoding and decoding framework is also referred to as a point cloud codec TMC13, and the V-PCC encoding and decoding framework is also referred to as a point cloud codec TMC2.

An embodiment of the present disclosure provides a data processing solution for point cloud media.

FIG. 1 is a schematic architectural diagram of a data processing system 100 for point cloud media according to an embodiment of the present disclosure.

As shown in FIG. 1, the data processing system 100 of the point cloud media includes a content consumption device 101 and a content production device 102. The content production device 102 refers to a computing device used by a provider of point cloud media (for example, a content producer of point cloud media). The computing device may be a device with the capability of encoding and encapsulating the point cloud media, such as a terminal (for example, a personal computer (PC) or a smart mobile device (for example, a smart phone)), a server, or a movable platform (for example, an unmanned aerial vehicle (UAV), or a robot). The content consumption device 101 refers to a computing device used by a person who uses the point cloud media (for example, a user). The computing device may be a device with the capability of decapsulating and decoding the point cloud media, such as a terminal (for example, a personal computer (PC), a smart mobile device (for example, a smart phone), or a virtual reality (VR) device (for example, a VR helmet or VR glasses)).

The content production device 102 and the content consumption device 101 may be connected directly or indirectly through wired communication or wireless communication, which is not limited in the embodiments of the present disclosure.

Figure 2A:
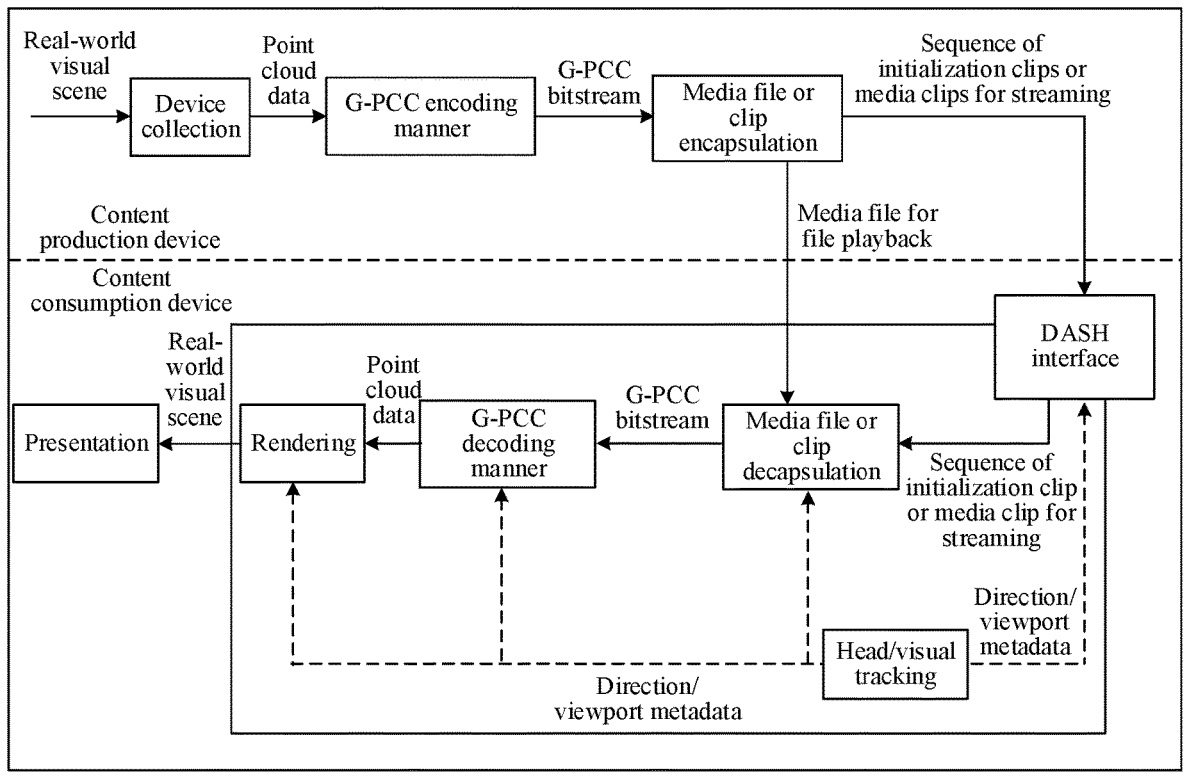
FIG. 2a is a schematic diagram of a data processing architecture for point cloud media according to certain embodiment(s) of the present disclosure.

FIG. 2a is a schematic architectural diagram of a data processing architecture for point cloud media according to an embodiment of the present disclosure. The data processing solution for point cloud media according to this embodiment of the present disclosure is described below with reference to the data processing system for point cloud media shown in FIG. 1 and the data processing architecture for point cloud media shown in FIG. 2a.

As shown in FIG. 2a, a data processing process of point cloud media includes a data processing process on a content production device side and a data processing process on a content consumption device side. The specific processing process is as follows:

I. Data Processing Process on Content Production Device Side:

(1) Process of Acquiring Point Cloud Data

In an implementation, from the perspective of the acquisition manner of the point cloud data, the acquisition manner of the point cloud data may be divided into two manners: collecting a real-world visual scene through a capture device to obtain the point cloud data, and generating the point cloud data through a computing device. In an implementation, the capture device may be a hardware component in the content production device, and for example, the capture device is a camera, sensor, or the like of a terminal. The capture device may alternatively be a hardware apparatus connected to the content production device, such as a camera connected to a server, and the like. The capture device is configured to provide a point cloud data acquisition service to the content production device, and the capture device may include, but is not limited to, any one of the following: a camera device, a sensing device, and a scanning device. The camera device may include a normal camera, a stereoscopic camera, a light field camera, or the like. The sensing device may include a laser device, a radar device, and the like. The scanning device may include a 3D laser scanning device and the like. There may be a plurality of capture devices, and the capture devices are deployed at specific positions in real space to simultaneously capture point cloud data at different angles in the space, and the captured point cloud data is synchronized both temporally and spatially. In another implementation, the computing device may generate point cloud data according to a virtual three-dimensional object and a virtual three-dimensional scene. Due to the different acquisition manners of the point cloud data, a compression encoding manner corresponding to the point cloud data acquired in different manners may also be different.

(2) Process of Encoding and Encapsulating Point Cloud Data

In an implementation, the content production device may encode the acquired point cloud data in a geometry-based point cloud compression (GPCC) encoding manner or video-based point cloud compression (VPCC) encoding manner, to obtain a GPCC bitstream or VPCC bitstream of the point cloud data. Taking the GPCC encoding manner as an example, the content production device uses a file track to encapsulate the GPCC bitstream of the encoded point cloud data. The so-called file track refers to an encapsulation container of the GPCC bitstream of the encoded point cloud data, and the encapsulation container is a standard for mixing and encapsulating multimedia contents (a video, an audio, a subtitle, chapter information, and the like) generated by an encoder. The encapsulation container can make synchronous playback of different multimedia contents simple. The GPCC bitstream may be encapsulated in a single file track, or may be encapsulated in multiple file tracks to form an encapsulated file. Details of GPCC bitstream encapsulation in a single file track and GPCC bitstream encapsulation in multiple file tracks are as follows:

① the GPCC Bitstream is Encapsulated in a Single File Track.

When the GPCC bitstream is transmitted in a single file track, the GPCC bitstream is desired to declare and represent according to a transmission rule of the single file track. The GPCC bitstream encapsulated in the single file track is not desired to further process and may be encapsulated through the International Organization for Standardization Basic Media File Format (ISOBMFF). In certain embodiment(s), each sample encapsulated in the single file track contains one or more GPCC components, and the so-called sample refers to a set of encapsulation structures of one or more point clouds, such as a type-length-value byte stream format (TLV) encapsulation structure. The sample is an encapsulation unit in an encapsulation process of point cloud media. The point cloud media contains multiple samples, and a sample is usually a media frame of the point cloud media. Taking video media as an example, a sample of the video media is a video frame.

Figure 2B:
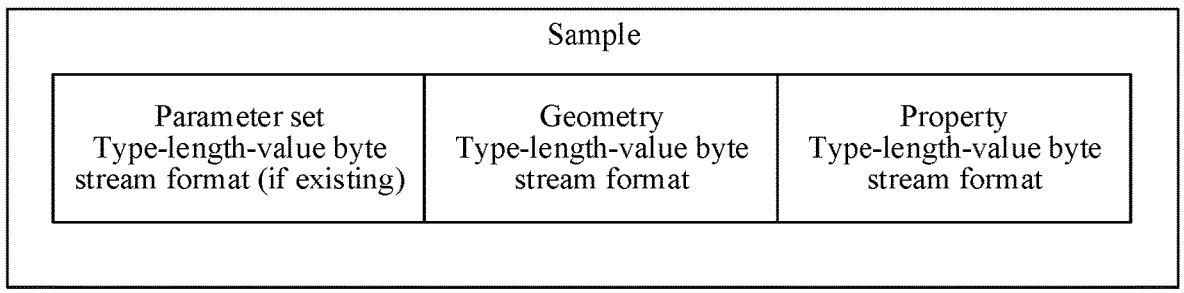
FIG. 2b and FIG. 2c are schematic structural diagrams of samples according to certain embodiment(s) of the present disclosure.

FIG. 2b is a schematic structural diagram of a sample according to an embodiment of the present disclosure.

As shown in FIG. 2b, when the transmission is performed in the single file track, the sample in the file track consists of a GPCC parameter set TLV, a geometric bitstream TLV, and a property bitstream TLV, and the sample is encapsulated into the single file track.

② the GPCC Bitstream is Encapsulated in Multiple File Tracks.

When the encoded GPCC geometric bitstream and the encoded GPCC property bitstream are transmitted in different file tracks, each sample in the file track contains at least one TLV encapsulation structure. The TLV encapsulation structure carries data of a single GPCC component, and the TLV encapsulation structure does not simultaneously contain the encoded GPCC geometric bitstream and the encoded GPCC property bitstream.

Assuming that there is a file track 1 and a file track 2, a sample 1 transmitted in the file track 1 may contain the encoded GPCC geometric bitstream and not contain the encoded GPCC property bitstream; and a sample 2 transmitted in the file track 2 may contain the encoded GPCC property bitstream and not contain the encoded GPCC geometric bitstream. Because the encoded GPCC geometric bitstream is to be decoded first by the content consumption device when decoding, and the decoding of the encoded GPCC property bitstream depends on decoded geometry information, different GPCC weight bitstreams are encapsulated in separate file tracks, so that the content consumption device may access the file track that hosts the encoded GPCC geometric bitstream before the encoded GPCC property bitstream.

Figure 2C:
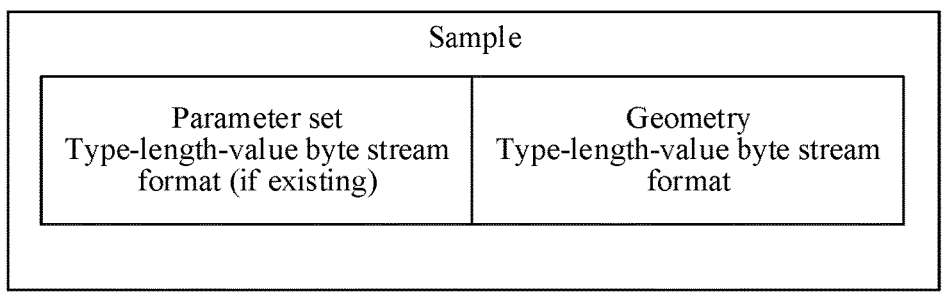

FIG. 2c is a schematic structural diagram of another sample according to an embodiment of the present disclosure.

As shown in FIG. 2c, when the transmission is performed in the multiple file tracks, the encoded GPCC geometric bitstream and the encoded GPCC property bitstream are transmitted in different file tracks. The sample in the file track is composed of the GPCC parameter set TLV and the geometric bitstream TLV. The sample does not contain the property bitstream TLV, and the sample is encapsulated in any file track among the multiple file tracks.

In an implementation, the acquired point cloud data is encoded and encapsulated by the content production device to form the encapsulated file of the point cloud media. The encapsulated file of the point cloud media may be an entire media file or a media clip in the media file. In addition, the content production device uses media presentation description information to record metadata of the encapsulated file of the point cloud media according to a file format desirable of the point cloud media. For example, a media presentation description (MPD) file is used to record the metadata of the encapsulated file of the point cloud media. The metadata herein is a general term for information related to presentation of the point cloud media, and the metadata may include description information for a media content, description information for a viewport, signaling information related to media content presentation, and the like. The content production device delivers the MPD file to the content consumption device, so that the content consumption device request to acquire the encapsulated file of the point cloud media according to the relevant description information in the MDP file. In certain embodiment(s), the encapsulated file of the point cloud media may be delivered from the content production device to the content consumption device through a transmission mechanism. As an example, the transmission mechanism may be dynamic adaptive streaming over HTTP (DASH) or smart media transport (SMT).

The content production device encapsulates the compressed point cloud data into a series of small hyper text transfer protocol (HTTP)-based media clips. A time of each media clip may be set. Although the time is usually short, each media clip has versions with multiple bit rates, so that network-adaptive download may be implemented more accurately. According to the current network conditions, the content consumption device adaptively selects to download and play version with a highest bit rate that the current network can carry, thus ensuring the quality of the current media and avoiding playback freeze or re-buffering events due to an excessive bit rate. Based on the above, it is possible to dynamically and seamlessly adapt to real-time network conditions and provide high-quality playback content with fewer freezes, which greatly improves the user experience. In other words, the bit rate switching takes the media clip as a unit. When the network bandwidth is good, the content consumption device may request a media clip with a corresponding higher bit rate at a corresponding time, while when the bandwidth becomes poor, the content consumption device downloads a media clip with a corresponding lower bit rate. Because the media clips of different quality are aligned in time, the picture is natural and smooth when switching between media clips of different quality.

Through the media presentation description (MPD) file, the encapsulated file may be more accurately described. The MPD file may be an extensive markup language (XML) file, which fully describes all the information of the encapsulated file, including various audio and video parameters, a duration of the media clip, a bit rate and resolution of different media clips, a corresponding uniform resource locator (URL), and the like. The content consumption device may acquire the media clip that best matches its performance and bandwidth by first downloading and parsing the MPD file. The MPD file may contain one or more adaptation sets. For example, an adaptation set contains video clips with multiple different bit rates in a same video content, and another adaptation set contains video clips with multiple different bit rates in a same audio content. An adaptation set may contain multiple representations. A representation may include a combination of one or more media contents, and for example, a video file at a certain resolution may be considered a representation.

The content consumption device transmits a request to a server to acquire the MPD file according to a URL of the MPD file. The content consumption device first parses the MPD file to obtain content information of the encapsulated file, including media configuration information such as a video resolution, a video content type, a segmentation situation, a frame rate, a bit rate, and a URL address of each media clip. By analyzing the content information of the encapsulated file, the content consumption device selects an appropriate media clip according to a current network state, a size of the client buffer, and the like. Then, the content consumption device transmits a request to the content production device, and downloads and streams the corresponding media clip according to the media URL. After receiving the corresponding encapsulated file, the content consumption device decapsulates the encapsulated file to obtain a bare bitstream, and finally sends the bare bitstream to a decoder for decoding and playback.

II. Data Processing Process on Content Consumption Device Side:

(1) Process of Decapsulating and Decoding Point Cloud Data

In an implementation, the content consumption device may acquire the encapsulated file of the point cloud media through the MDP file delivered by the content production device. The file decapsulation process on the content consumption device side is opposite to the file encapsulation process on the content production device side. The content consumption device decapsulates the encapsulated file of the point cloud media according to the file format desirable of the point cloud media, to obtain the encoded bitstream, that is, the GPCC bitstream or the VPCC bitstream. The decoding process on the content consumption device side is opposite to the encoding process on the content production device side. The content consumption device decodes the encoded bitstream and restores the point cloud data. A rendering process of the point cloud data. In an implementation, the content consumption device renders the point cloud data obtained by decoding the GPCC bitstream according to metadata related to rendering and viewport in the MDP file, and when the rendering is performed, the presentation of the visual scene corresponding to the point cloud data is implemented.

In this embodiment of the present disclosure, for the content production device side, first, the real-world visual scene is sampled by a collection device, to obtain point cloud data corresponding to the real-world visual scene. Then, the obtained point cloud data is encoded in the GPCC encoding manner or VPCC encoding manner to obtain a GPCC bitstream or VPCC bitstream, where the GPCC bitstream or VPCC bitstream may include encoded geometric bitstream and encoded property bitstream. Then, the GPCC bitstream or VPCC bitstream is encapsulated to obtain an encapsulated file of point cloud media, that is, a media file or media clip. The content production device may also encapsulate the metadata into the media file or media clip, and deliver the encapsulated file of the point cloud media to the content consumption device through the transmission mechanism. For example, the encapsulated file of the point cloud media is delivered to the content consumption device through the DASH mechanism.

For the content consumption device side, the content consumption device first receives the encapsulated file of the point cloud media transmitted by the content production device. Then, the content consumption device decapsulates the encapsulated file of point cloud media to obtain the encoded GPCC bitstream (or VPCC bitstream) and the metadata. Then, the metadata in the encoded GPCC bitstream or VPCC bitstream is parsed, that is, the encoded GPCC bitstream or VPCC bitstream is decoded to obtain the point cloud data. Finally, based on a current viewing (viewport) direction of the user, the decoded point cloud data is rendered and displayed in the content consumption device. The current viewing (viewport) direction of the user is determined by head tracking and visual tracking functions. In addition to rendering the point cloud data in the current viewing (viewport) direction of the user by a renderer, an audio in the current viewing (viewport) direction of the user may also be decoded and adjusted by an audio decoder. The content production device encodes and encapsulates the collected point cloud data, so that storage and transmission of the point cloud data are implemented. The content production device delivers the encapsulated file of the point cloud media obtained by encapsulation to the content consumption device, so that publishing and sharing of point cloud data are implemented. The content consumption device decapsulates, decodes, and consumes the encapsulated file of the point cloud media, so that a real-world visual scene can be presented in the content consumption device.

It may be understood that, the data processing system for point cloud media described in this embodiment of the present disclosure aims to describe the technical solutions of the embodiments of the present disclosure more clearly, but does not constitute a limitation on the technical solutions of the embodiments of the present disclosure. A person of ordinary skill in the art may know that, as a system architecture evolves and a new service scenario emerges, the technical solutions provided in the embodiments of the present disclosure are also applicable to similar technical problems or scenarios.

It can be learned from the data processing process of point cloud media that the content production device may encode the point cloud media and encapsulate the encoded point cloud media into the encapsulated file of the point cloud media before delivering the point cloud media to the content consumption device. Correspondingly, the content consumption device may decapsulate and decode the encapsulated file of the point cloud media before rendering and presenting the point cloud media. The data processing system of the point cloud media provided in this embodiment of the present disclosure supports a box, such as an ISOBMFF box. The box refers to a data block including metadata or an object including metadata, that is, the box contains metadata of the point cloud media. The point cloud media may be associated with multiple boxes, such as a property information box that may be used for describing property information of a viewing region corresponding to point cloud media. The property information box may be used for decoding an encoded GPCC bitstream or VPCC bitstream.

The point cloud media involved in the embodiments of the present disclosure includes dynamic point cloud media and static point cloud media, and the static point cloud media is also referred to as non-sequential point cloud media. For the static point cloud media in certain existing art, an encapsulation method for non-sequential point cloud media does not support the solution of determining a recommended viewing region for the non-sequential point cloud media. Therefore, the present disclosure introduces, for the non-sequential point cloud media, property information of a viewing region corresponding to the non-sequential point cloud media on the basis of an encapsulation structure of the non-sequential point cloud media, and thus the request and consumption of the non-sequential point cloud media according to the property information of the viewing region corresponding to the non-sequential point cloud media can be supported on the basis of the encapsulation structure of the non-sequential point cloud media, which makes the transmission and consumption processes of the non-sequential point cloud media more efficient, and supports a more flexible non-sequential point cloud media presentation form.

Figure 3:
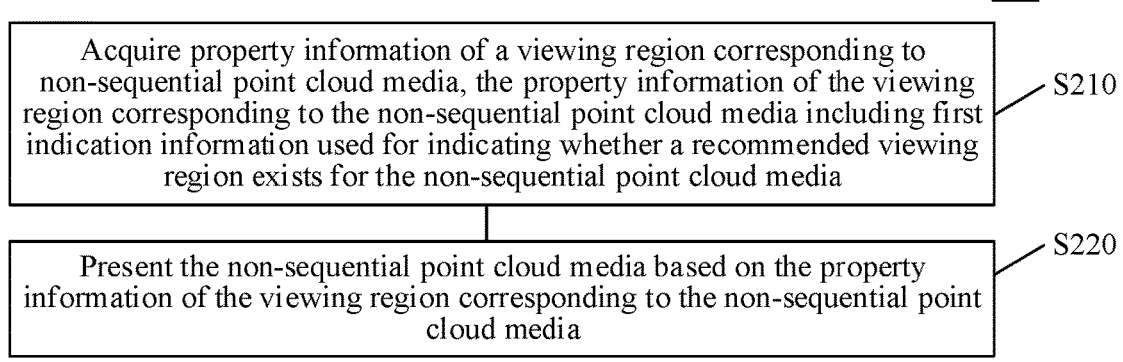
FIG. 3 to FIG. 7 are schematic flowcharts of a data processing method for non-sequential point cloud media according to certain embodiment(s) of the present disclosure.

FIG. 3 is a schematic flowchart of a data processing method 200 for point cloud media according to an embodiment of the present disclosure. The method 200 may be performed by a content consumption device in a point cloud media system, such as a content consumption client.

As shown in FIG. 3, the method 200 may include the following steps.

S210: Acquire property information of a viewing region corresponding to non-sequential point cloud media, the property information of the viewing region corresponding to the non-sequential point cloud media including first indication information used for indicating whether a recommended viewing region exists for the non-sequential point cloud media. In certain embodiment(s), the first indication information may also be understood as being used for indicating whether the property information of the viewing region corresponding to the non-sequential point cloud media includes a recommended viewing region of the non-sequential point cloud media.

S220: Present the non-sequential point cloud media based on the property information of the viewing region corresponding to the non-sequential point cloud media.

After acquiring the property information of the viewing region corresponding to the non-sequential point cloud media, the content consumption device may present the non-sequential point cloud media according to specific information in the property information of the viewing region corresponding to the non-sequential point cloud media.

It may be understood that, if the first indication information indicates that the recommended viewing region exists for the non-sequential point cloud media, the property information of the viewing region includes property information of the recommended viewing region, and thus non-sequential point cloud media located in the recommended viewing region may be presented based on the property information of the recommended viewing region.

For example, a content preparation device determines a viewing region of the point cloud file and a viewing time of the recommended viewing region according to the content of the non-sequential point cloud media, the viewing region including an initial viewing region and the recommended viewing region, and the recommended viewing region including the initial viewing region. The content preparation device generates a property information box and a corresponding signaling message in an encapsulation process of the non-sequential point cloud media according to the recommended viewing region of the non-sequential point cloud media. The content preparation device transmits the signaling message to the content consumption device. The content consumption device requests a corresponding encapsulated file according to the signaling message. The content consumption device receives the encapsulated file transmitted by the content preparation device. The content consumption device presents the content of the non-sequential point cloud media for the user based on the signaling message and corresponding property information box information in the encapsulated file according to the initial viewing region, recommended viewing region, recommended viewing time, and other information of the non-sequential point cloud media.

In some embodiments, if M recommended viewing regions do not exist for the non-sequential point cloud media, a value of the first indication information is a first value; and if property information of the M recommended viewing regions exists for the non-sequential point cloud media, the value of the first indication information is a second value, and M≥1. In an implementation, the property information of the viewing region corresponding to the non-sequential point cloud media includes the property information of the M recommended viewing regions. The property information of the M recommended viewing regions includes at least one of the following: three-dimensional spatial structure data corresponding to the M recommended viewing regions, a region identifier corresponding to the M recommended viewing regions, and a title identifier corresponding to the M recommended viewing regions. In an implementation, the property information of the viewing region corresponding to the non-sequential point cloud media includes the property information of the M recommended viewing regions. The property information of the viewing region corresponding to the non-sequential point cloud media further includes quantity indication information, a value of the quantity indication information being used for indicating a quantity of the M recommended viewing regions, and the quantity of the M recommended viewing regions being greater than 0.

When indicating that the recommended viewing region exists for the non-sequential point cloud media, by indicating the recommended viewing region of the non-sequential point cloud media, the client can be supported to request and consume the non-sequential point cloud media according to the recommended viewing region, which makes the transmission and consumption processes of the non-sequential point cloud media more efficient, and supports a more flexible non-sequential point cloud media presentation form.

In some embodiments, the property information of the viewing region corresponding to the non-sequential point cloud media further includes second indication information, the second indication information being used for indicating whether the property information of the viewing region includes property information of an initial viewing region. If the property information of the viewing region corresponding to the non-sequential point cloud media does not include the property information of the initial viewing region, a value of the second indication information is a third value. If the property information of the viewing region corresponding to the non-sequential point cloud media includes the property information of the initial viewing region, the value of the second indication information is a fourth value. In an implementation, if an initial viewing region exists for the non-sequential point cloud media, the property information of the viewing region corresponding to the non-sequential point cloud media includes property information of the initial viewing region. If no initial viewing region exists for the non-sequential point cloud media, the property information of the viewing region corresponding to the non-sequential point cloud media does not include the property information of the initial viewing region. In certain embodiment(s), this embodiment of the present disclosure is not limited thereto. It may be understood that, if the second indication information indicates that the property information of the viewing region includes the property information of the initial viewing region, the content of the non-sequential point cloud media located in the initial viewing region may be presented according to the property information of the initial viewing region.

In some embodiments, the property information of the viewing region corresponding to the non-sequential point cloud media further includes third indication information used for indicating whether the recommended viewing region of the non-sequential point cloud media includes the initial viewing region. If the recommended viewing region of the non-sequential point cloud media does not include the initial viewing region, a value of the third indication information is a fifth value. If the recommended viewing region of the non-sequential point cloud media includes the initial viewing region, the value of the third indication information is a sixth value. In an implementation, if the initial viewing region exists for the non-sequential point cloud media, and the recommended viewing region of the non-sequential point cloud media does not include the initial viewing region, the value of the third indication information is the fifth value. If the initial viewing region exists for the non-sequential point cloud media, and the recommended viewing region of the non-sequential point cloud media includes the initial viewing region, the value of the third indication information is the sixth value. In certain embodiment(s), this embodiment of the present disclosure is not limited thereto.

In some embodiments, if the recommended viewing region includes an initial viewing region, the non-sequential point cloud media located in the initial viewing region may be presented based on property information of the initial viewing region. After the content of the non-sequential point cloud media located in the initial viewing region is presented and when or in response to a determination that a region presentation condition is satisfied, the content of non-sequential point cloud media located in a remaining recommended viewing region may be presented based on property information of the remaining recommended viewing region, the remaining recommended viewing region referring to recommended viewing regions in the M recommended viewing regions except the initial viewing region.

It may be understood that the non-sequential point cloud media located in either the recommended viewing region or the initial viewing region is part of the point cloud media content, that is, the point cloud media content that belongs to part of the region. In some embodiments, the property information of the viewing region corresponding to the non-sequential point cloud media includes property information of an initial viewing region. The property information of the initial viewing region includes at least one of the following: three-dimensional spatial structure data of the initial viewing region, a region identifier corresponding to the three-dimensional spatial structure data of the initial viewing region, and a title identifier corresponding to the three-dimensional spatial structure data of the initial viewing region.

In some embodiments, the property information of the viewing region corresponding to the non-sequential point cloud media includes property information of M recommended viewing regions. The property information of the viewing region corresponding to the non-sequential point cloud media further includes presentation duration indication information, the presentation duration indication information being used for indicating whether the property information of the viewing region corresponding to the non-sequential point cloud media includes presentation durations of the M recommended viewing regions. If the presentation duration indication information is used for indicating that the property information of the viewing region corresponding to the non-sequential point cloud media includes the presentation durations of the M recommended viewing regions, the property information of the viewing region corresponding to the non-sequential point cloud media further includes presentation duration information, a value of the presentation duration information being used for indicating the presentation duration of each recommended viewing region in the M recommended viewing regions, and M≥1.

In some embodiments, the property information of the recommended viewing region includes a region identifier of the recommended viewing region. In this embodiment, the presenting the non-sequential point cloud media located in the recommended viewing region based on property information of the recommended viewing region included in the property information of the viewing region includes: when or in response to a determination that there are a plurality of recommended viewing regions, determining a presentation order corresponding to the plurality of recommended viewing regions based on the region identifier of each of the recommended viewing regions, and sequentially presenting, according to the presentation order and corresponding presentation duration information, the non-sequential point cloud media located in each of the recommended viewing regions based on property information of each of the recommended viewing regions.

In a specific implementation, in the present disclosure, several descriptive fields are added at a system layer, including field extensions at the file encapsulation level and the system signaling level, to support the implementation steps of the present disclosure. In the following, an example is given in the form of extending an ISOBMFF box (that is, a property information box) and a DASH signaling, in which the property information of the viewing region for the non-sequential point cloud file and indication signaling of the viewing region for the non-sequential point cloud file are defined.

Regarding an example of a syntax of the property information box, an implementation may refer to Table 1 below:

TABLE 1

```
aligned(8) class RecommendedSpatialInfoProperty extends
ItemProperty('grsi') {
    unsigned int(1) initial_region_indicated;
    unsigned int(1) recommended_region_indicated;
    unsigned int(1) presentation_duration_indicated;
    bit(5) reserved;
    if(initial_region_indicated == 1){
    3DSpatialRegionStruct(1);
    }
    if(recommended_region_indicated == 1){
    unsigned int(8) num_recommended_regions;
        for(int i=0; i< num_recommended_regions; i++){
            3DSpatialRegionStruct(1);
            if(presentation_duration_indicated){
                unsigned int(32) presentation_duration;
    }
        }
    }
}
```

The semantic of the syntax involved in Table 1 is as follows:

1. Indication Information of Initial Viewing Region (Initial_Region_Indicated):

Used for indicating whether the property information box includes the property information of the initial viewing region of the non-sequential point cloud media. For example, when the value is 1, it indicates that the property information box contains the property information of the initial viewing region of the non-sequential point cloud media. When the value is 0, it indicates that the property information box does not contain the property information of the initial viewing region of the non-sequential point cloud media. For ease of description, in the present disclosure, the indication information of the initial viewing region is referred to as the second indication information for short.

2. Indication Information of Recommended Viewing Region (Recommended_Region_Indicated):

Used for indicating whether the property information box includes the property information of the recommended viewing region of the non-sequential point cloud media. For example, when the value is 1, it indicates that the property information box contains the property information of the recommended viewing region of the non-sequential point cloud media. When the value is 0, it indicates that the property information box does not contain the property information of the recommended viewing region of the non-sequential point cloud media. For ease of description, in the present disclosure, the indication information of the recommended viewing region is referred to as the first indication information for short. When the value of the first indication information is 1, if the recommended viewing region contains the initial viewing region, the value of the second indication information may be 0. However, the present disclosure does not impose a limitation thereon, and both the value of the first indication information and the value of the second indication information may be set to 1 simultaneously. The property information of the initial viewing region may also contain the property information of the recommended viewing region.

3. Presentation Duration Indication Information (Presentation_Duration_Indicated):

Used for indicating whether the property information box includes the presentation duration information corresponding to the recommended viewing region. For example, when the value is 1, it indicates that the property information box contains the presentation duration information of the recommended viewing region of the non-sequential point cloud media. When the value is 0, it indicates that the property information box does not contain the presentation duration information of the recommended viewing region of the non-sequential point cloud media.

4. Three-Dimensional Spatial Structure Data (3D SpatialRegionStruct):

Used for indicating the three-dimensional spatial structure data of the viewing region of the non-sequential point cloud media, and for example, used for indicating three-dimensional spatial structure data of the initial viewing region or three-dimensional spatial structure data of the recommended viewing region.

5. Quantity Indication Information (Num_Recommended_Regions):

Used for indicating the quantity of the recommended viewing region.

6. Presentation Duration Information (Presentation_Duration):

Used for indicating the presentation duration of the recommended viewing region.

For the initial viewing region and the recommended viewing region, corresponding spatial information may alternatively be indexed by using a title identifier (title ID) or a region identifier (region ID) in addition to directly indicating the three-dimensional spatial structure data. Each title identifier corresponds to a viewing region, and each region identifier corresponds to a viewing region. The three-dimensional spatial structure data (3DSpatialRegionStruct) may include the corresponding region identifier.

Regarding an example of a syntax of the property information box, an implementation may refer to Table 2 below:

TABLE 2

```
aligned(8) class RecommendedSpatialInfoProperty extends
ItemProperty('grsi') {
    unsigned int(1) initial_region_indicated;
    unsigned int(1) recommended_region_indicated;
    unsigned int(1) presentation_duration_indicated;
    bit(5) reserved;
    if(initial_region_indicated == 1){
  unsigned int(8) num_tiles;
  for(int i=0; i<num_tiles; i++){
  unsigned int(16) tile_id;
  }
  }
    if(recommended_region_indicated == 1){
  unsigned int(8) num_recommended_regions;
  for(int i=0; i< num_recommended_regions; i++){
  unsigned int(8) num_tiles;
  for(int i=0; i<num_tiles; i++){
  unsigned int(16) tile_id;
  }
  if(presentation_duration_indicated){
  unsigned int(32) presentation_duration;
  }
    }
  }
}
```

The semantic of the syntax involved in Table 2 is as follows:

7. Title Identifier Quantity (Num_Tiles):

Used for indicating the quantity of the title identifier corresponding to the initial viewing region or the recommended viewing region.

8. Title Identifier (Tile_Id):

Used for indicating the title identifier corresponding to the initial viewing region or the recommended viewing region.

It is to be understood that the meanings of other elements in Table 2 may be referred to the meanings of the corresponding elements in Table 1. To avoid repetition, details are not described herein again.

Regarding an example of a syntax of the property information box, an implementation may refer to Table 3 below:

TABLE 3

```
aligned(8) class RecommendedSpatialInfoProperty extends
ItemProperty('grsi') {
    unsigned int(1) initial_region_indicated;
    unsigned int(1) recommended_region_indicated;
    unsigned int(1) presentation_duration_indicated;
    bit(5) reserved;
    if(initial_region_indicated == 1){
  unsigned int(8) num_regions;
  for(int i=0; i< num_regions; i++){
  unsigned int(16) region_id;
  }
  }
```

TABLE 3-continued

```
if(recommended_region_indicated == 1){
unsigned int(8) num_recommended_regions;
for(int i=0; i< num_recommended_regions; i++){
unsigned int(8) num_regions;
for(int i=0; i< num_regions; i++){
unsigned int(16) region_id;
}
if(presentation_duration_indicated){
unsigned int(32) presentation_duration;
}
    }
  }
}
```

The semantic of the syntax involved in Table 1 is as follows:

9. Region Identifier Quantity (Num_Regions):

Used for indicating the quantity of the region identifier corresponding to the initial viewing region or the recommended viewing region.

10. Region Identifier (Region_Id):

Used for indicating the region identifier corresponding to the initial viewing region or the recommended viewing region.

It is to be understood that the meanings of other elements in Table 2 may be referred to the meanings of the corresponding elements in Table 1. To avoid repetition, details are not described herein again.

Tables 1 to 3 are merely examples of the present disclosure and shall not be construed as a limitation on the present disclosure. For example, in other alternative embodiments of the present disclosure, the property information box may be extended to a full box, that is, information such as a version field may be further added to the property information box. In addition, the property information box in Table 1 is a box applied to the GPCC encapsulation technology, and in other alternative embodiments, the solution of the present disclosure may alternatively be applied to the VPCC encapsulation technology. The property information box of the non-sequential point cloud media may be a box in an ISO base media file format (ISOBMFF). After acquiring the component information box of the non-sequential point cloud media, the content consumption device phases the property information corresponding to the point cloud media according to the property information box, and presents the non-sequential point cloud media based on the parsed property information.

For the DASH signaling, details may be referred to Table 4:

TABLE 4

| Descriptor element and property (RcmdSpatialInfo) | Data type | Description |
|---|---|---|
| Container element (grsi) | | Used for defining a property related to the recommended viewing region. |
| grsi@ initialRegionIndicated | 1 bit | Used for indicating whether a descriptor contains the property information of the initial viewing region of the non-sequential point cloud media. For example, when the value is 1, it indicates that the descriptor contains the property information of the initial viewing region of the non-sequential point cloud media. When the value is 0, it indicates that the descriptor does not contain the property information of the initial viewing region of the non-sequential point cloud media. |
| grsi@ rcmdRegionIndicated | 1 bit | Used for indicating whether the descriptor includes the property information of the recommended viewing region of the non-sequential point cloud media. For example, when the value is 1, it indicates that the descriptor contains the property information of the recommended viewing region of the non-sequential point cloud media. When the value is 0, it indicates that the descriptor does not contain the property information of the recommended viewing region of the non-sequential point cloud media. |
| grsi@ preDurationIndicated | 1 bit | Used for indicating whether the descriptor contains the presentation duration information corresponding to the recommended viewing region. For example, when the value is 1, it indicates that the descriptor contains the presentation duration information corresponding to the recommended viewing region. When the value is 0, it indicates that the descriptor does not contain the presentation duration information corresponding to the recommended viewing region. |

TABLE 4-continued

| Descriptor element and property (RcmdSpatialInfo) | Data type | Description |
|---|---|---|
| grsi.initial3DSpatialRegion | gpcc: space region type | Used for defining the three-dimensional spatial region of the initial viewing region. |
| grsi.initial3DSpatialRegion@id | xs: unsigned integer (unsignedShort) | A region identifier of the three-dimensional spatial region of the initial viewing region, the value of which may be the same as that of the region identifier in the corresponding property information box. |
| grsi.initial3DSpatialRegion@x | xs: interger (int) | An x-coordinate value of an anchor point of the three-dimensional spatial region of the initial viewing region. If the field does not exist, the default value of the field is 0. |
| grsi.initial3DSpatialRegion@y | xs: int | A y-coordinate value of the anchor point of the three-dimensional spatial region of the initial viewing region. If the field does not exist, the default value of the field is 0. |
| grsi.initial3DSpatialRegion@z | xs: int | A z-coordinate value of the anchor point of the three-dimensional spatial region of the initial viewing region. If the field does not exist, the default value of the field is 0. |
| grsi.initial3DSpatialRegion@dx | xs: int | A length (that is, width) of the three-dimensional spatial region of the initial viewing region along an x-axis direction. When the field is negative, it means the length along a negative x-axis direction. |
| grsi.initial3DSpatialRegion@dy | xs: int | A length (that is, height) of the three-dimensional spatial region of the initial viewing region along a y-axis direction. When the field is negative, it means the length along a negative y-axis direction. |
| grsi.initial3DSpatialRegion@dz | xs: int | A length (that is, depth) of the three-dimensional spatial region of the initial viewing region along a z-axis direction. When the field is negative, it means the length along a negative z-axis direction. |
| grsi.rcmd3DSpatialRegion | gpcc: spatialRegionType | Used for defining the three-dimensional spatial region of the recommended viewing region. |
| grsi.rcmd3DSpatialRegion@id | xs:unsignedShort | A region identifier of the three-dimensional spatial region of the recommended viewing region, a field of which may be the same as that of the region identifier in the corresponding property information box. |
| grsi.rcmd3DSpatialRegion@x | xs: int | An x-coordinate value of an anchor point of the three-dimensional spatial region of the recommended viewing region. If the field does not exist, the default value of the field is 0. |
| grsi.rcmd3DSpatialRegion@y | xs: int | A y-coordinate value of the anchor point of the three-dimensional spatial region of the recommended viewing region. If the field does not exist, the default value of the field is 0. |
| grsi.rcmd3DSpatialRegion@z | xs: int | A z-coordinate value of the anchor point of the three-dimensional spatial region of the recommended viewing region. If the field does not exist, the default value of the field is 0. |
| grsi.rcmd3DSpatialRegion@dx | xs: int | A length (that is, width) of the three-dimensional spatial region of the recommended viewing region along an x-axis direction. When the field is negative, it means the length along a negative x-axis direction. |
| grsi.rcmd3DSpatialRegion@dy | xs: int | A length (that is, height) of the three-dimensional spatial region of the recommended viewing region along a y-axis direction. When the field is negative, it means the length along a negative y-axis direction. |

TABLE 4-continued

| Descriptor element and property (RcmdSpatialInfo) | Data type | Description |
|---|---|---|
| grsi.rcmd3DSpatialRegion@dz | xs: int | A length (that is, depth) of the three-dimensional spatial region of the recommended viewing region along a z-axis direction. When the field is negative, it means the length along a negative z-axis direction. |
| grsi.rcmd3DSpatialRegion@preDuration | unsigned int (32) | Indicate the presentation duration of the recommended viewing region |

The semantic of the element involved in Table 4 is as follows:

Descriptor is a representation method of a data characteristic, which defines the syntax and semantic of the data characteristic. A recommended spatial information (RcmdSpatialInfo) descriptor is used for describing an element and a property associated with a GPCC item, and the descriptor is a supplemental property element. The MPD file may contain one or more adaptation sets. An adaptation set contains multiple video clips with different bit rates in a same video content, and another adaptation set contains multiple video clips with different bit rates in the same audio content. An adaptation set may contain multiple representations. A representation may include a combination of one or more media contents, and for example, a video file at a certain resolution may be considered a representation. The descriptor may be at an adaptation set level or a representation level. grsi @ "xxx" represents an element and a property "xxx" included in a container element of the descriptor.

For the initial viewing region and the recommended viewing region, corresponding spatial information may alternatively be indexed by using a title identifier (title ID) or a region identifier (region ID) in addition to directly indicating the three-dimensional spatial structure data. Each title identifier corresponds to a viewing region, and each region identifier corresponds to a viewing region. The three-dimensional spatial structure data (3DSpatialRegionStruct) may include the corresponding region identifier. Based on the above, the corresponding DASH signaling may be as shown in Table 5:

TABLE 5

| Descriptor element and property (RcmdSpatialInfo) | Data type | Description |
|---|---|---|
| Container element (grsi) | | Used for defining a property related to the recommended viewing region. |
| grsi@ initialRegionIndicated | bit (1) | Used for indicating whether the descriptor includes the property information of the initial viewing region of the non-sequential point cloud media. For example, when the value is 1, it indicates that the descriptor contains the property information of the initial viewing region of the non-sequential point cloud media. When the value is 0, it indicates that the descriptor does not contain the property information of the initial viewing region of the non-sequential point cloud media. |
| grsi@ rcmdRegionIndicated | bit (1) | Used for indicating whether the descriptor includes the property information of the recommended viewing region of the non-sequential point cloud media. For example, when the value is 1, it indicates that the descriptor contains the property information of the recommended viewing region of the non-sequential point cloud media. When the value is 0, it indicates that the descriptor does not contain the property information of the recommended viewing region of the non-sequential point cloud media. |
| grsi@ preDurationIndicated | bit (1) | Used for indicating whether the descriptor contains the presentation duration information corresponding to the recommended viewing region. For example, when the value is 1, it indicates that the descriptor contains the presentation duration information corresponding to the recommended viewing region. When the value is 0, |

TABLE 5-continued

| Descriptor element and property (RcmdSpatialInfo) | Data type | Description |
|---|---|---|
| | | it indicates that the descriptor does not contain the presentation duration information corresponding to the recommended viewing region. |
| grsi.initial3DSpatialRegion | | Used for defining the three-dimensional spatial region of the initial viewing region. |
| grsi.initial3DSpatialRegion@ initalTileIds | xs: UIntVectorType | A space-separated title identifier list, indicating a title identifier of the three-dimensional spatial region of the initial viewing region. |
| grsi.rcmd3DSpatialRegion | | Used for defining the three-dimensional spatial region of the recommended viewing region. |
| grsi.rcmd3DSpatialRegion@ rcmdTileIds | xs: UIntVectorType | A space-separated title identifier list, indicating a title identifier of the three-dimensional spatial region of the recommended viewing region. |
| grsi.rcmd3DSpatialRegion@preDuration | unsigned int (32) | Indicating the presentation duration of the recommended viewing region. |

In certain embodiment(s), the title identifier in the DASH signaling in Table 4 may alternatively be replaced with the region identifier. To avoid repetition, details are not described herein again.

For specific implementation scenarios, a data processing solution for non-sequential point cloud media provided in an embodiment of the present disclosure is described below with reference to FIG. 4 to FIG. 6.

In some embodiments, S210 may include:

receiving a dynamic adaptive streaming over HTTP (DASH) signaling message transmitted by a content production device, the signaling message including the property information of the viewing region corresponding to the non-sequential point cloud media, and the property information of the viewing region corresponding to the non-sequential point cloud media including the property information of the initial viewing region of the non-sequential point cloud media; transmitting an acquisition request to the content production device based on the property information of the initial viewing region of the non-sequential point cloud media, the acquisition request carrying target description information, and the target description information being used for describing a target encapsulated file including the initial viewing region; and receiving the target encapsulated file returned according to the acquisition request by the content production device, the target encapsulated file including a property information box of the non-sequential point cloud media, and the property information box being used for defining the property information of the viewing region corresponding to the non-sequential point cloud media. Based on the above, in S220, the target encapsulated file may be presented based on the property information of the viewing region corresponding to the non-sequential point cloud media in the signaling message and the property information of the viewing region corresponding to the non-sequential point cloud media in the property information box.

In some embodiments, if the first indication information indicates that the recommended viewing region exists for the non-sequential point cloud media, the property information of the viewing region in the signaling message and the property information of the viewing region in the property information box include property information of the recommended viewing region, and non-sequential point cloud media in the recommended viewing region is encapsulated in the target encapsulated file. Therefore, the property information of the recommended viewing region may be determined from the property information of the viewing region in the signaling message and the property information of the viewing region in the property information box, and the non-sequential point cloud media located in the recommended viewing region in the target encapsulated file may be presented based on the property information of the recommended viewing region.

In some embodiments, the signaling message may be a DASH signaling message.

Figure 4:
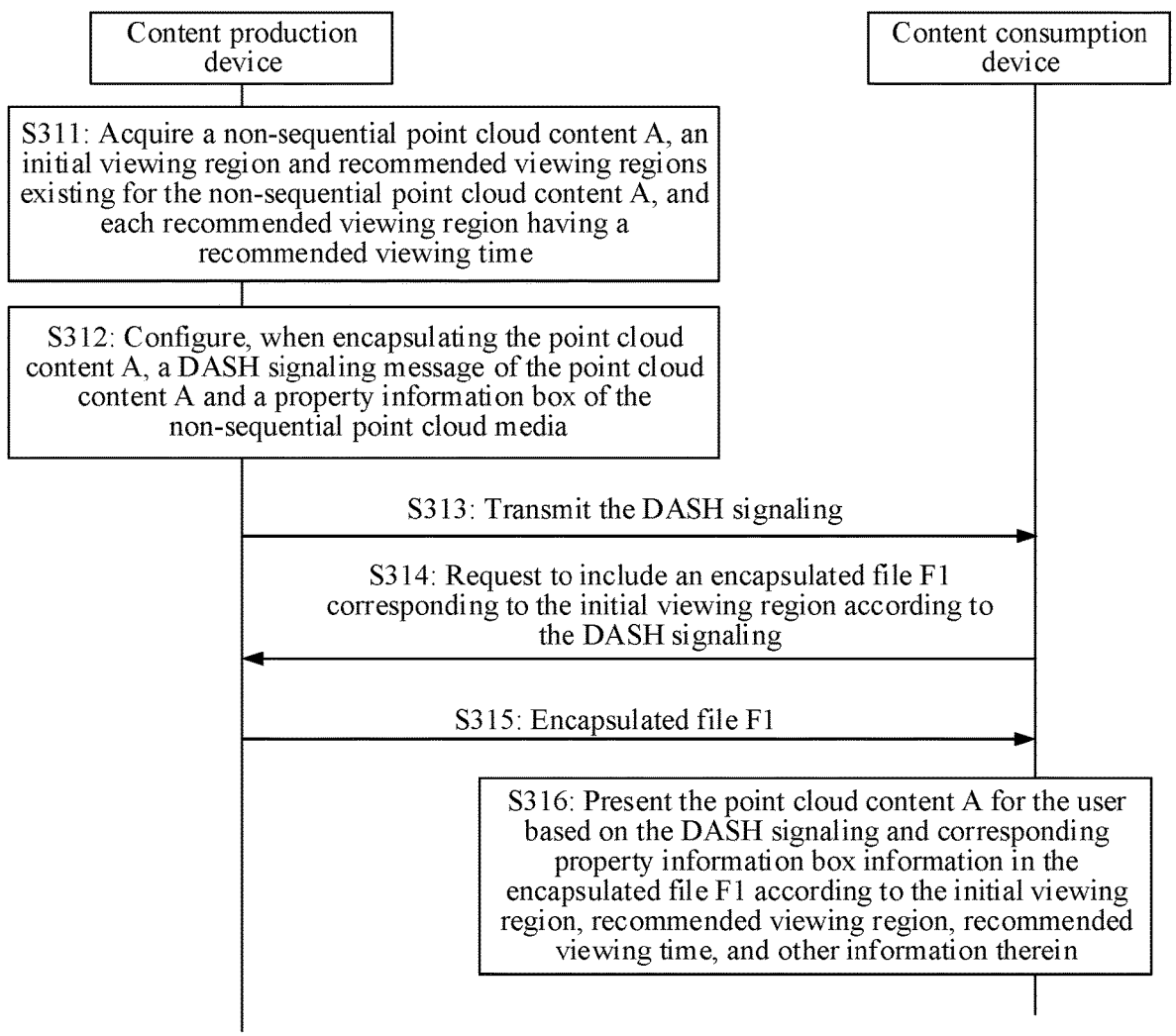

FIG. 4 is a schematic flowchart of a data processing method 310 for non-sequential point cloud media according to an embodiment of the present disclosure. The method 310 may be interactively performed by the content production device 102 and the content consumption device 101 in the embodiment shown in FIG. 1. As shown in FIG. 5, the data processing method 310 for non-sequential point cloud media may include part or all of the following contents:

S311: The content production device acquires a non-sequential point cloud content A, an initial viewing region and recommended viewing regions existing for the non-sequential point cloud content A, and each recommended viewing region having a recommended viewing time.

S312: When encapsulating the point cloud content A, the content production device configures a DASH signaling message of the point cloud content A and a property information box of the point cloud content A. As an example, corresponding property information box information and DASH signaling message are as follows:

F1:item1: RecommendedSpatialInfoProperty:

initial_region_indicated=1; recommended_region_indicated=1; presentation_duration_indicated=1;

initial_region: {3d_region_id=1001, anchor=(0,0,0), region=(100,100,100)};

recommended_region:

{3d_region_id=1001, anchor=(0,0,0), region=(100,100, 100), presentation_duration=5000}; {3d_region_id=1002, anchor=(0,100,0), region=(100,100,100), presentation_duration=5000}; {3d_region_id=1003, anchor=(0,200,0), region=(100,100,100), presentation_duration=5000}.

S313: The content production device transmits the DASH signaling message to the content consumption device. Information of a relevant field in the DASH signaling corresponds to the information in the property information box. To avoid repetition, details are not described herein again.

S314: The content consumption device requests the content production device to include an encapsulated file F1 corresponding to the initial viewing region according to the DASH signaling.

S315: The content production device transmits the encapsulated file F1 to the content consumption device.

S316: The content consumption device presents the point cloud content A for the user based on the DASH signaling and corresponding property information box information in the encapsulated file F1 according to the initial viewing region, recommended viewing region, recommended viewing time, and other information of the point cloud content A. That is, a region 1001 (a presentation time is 5000 ms) is presented first, a region 1002 (a presentation time is 5000 ms) is presented, and finally a region 1003 (a presentation time is 5000 ms) is presented. In a specific presentation form, the content consumption device may directly switch the screen for the user after the presentation time is reached, or may switch the screen for the user through a prompt of an implementation interface after the user determines to switch, which is not limited in the present disclosure.

In some embodiments, S210 may include:

receiving a target encapsulated file transmitted by a content production device and including the initial viewing region of the non-sequential point cloud media, the target encapsulated file including a property information box of the non-sequential point cloud media, and the property information box being used for defining the property information of the viewing region corresponding to the non-sequential point cloud media. Based on the above, in S220, the target encapsulated file may be presented based on the property information of the viewing region corresponding to the non-sequential point cloud media in the property information box.

In some embodiments, if the first indication information indicates that the recommended viewing region exists for the non-sequential point cloud media, the property information of the viewing region in the property information box includes property information of the recommended viewing region, and the non-sequential point cloud media in the recommended viewing region is encapsulated in the target encapsulated file. Therefore, the property information of the recommended viewing region may be determined based on the property information of the viewing region in the property information box, and the non-sequential point cloud media located in the recommended viewing region in the target encapsulated file may be presented based on the property information of the recommended viewing region.

Figure 5:
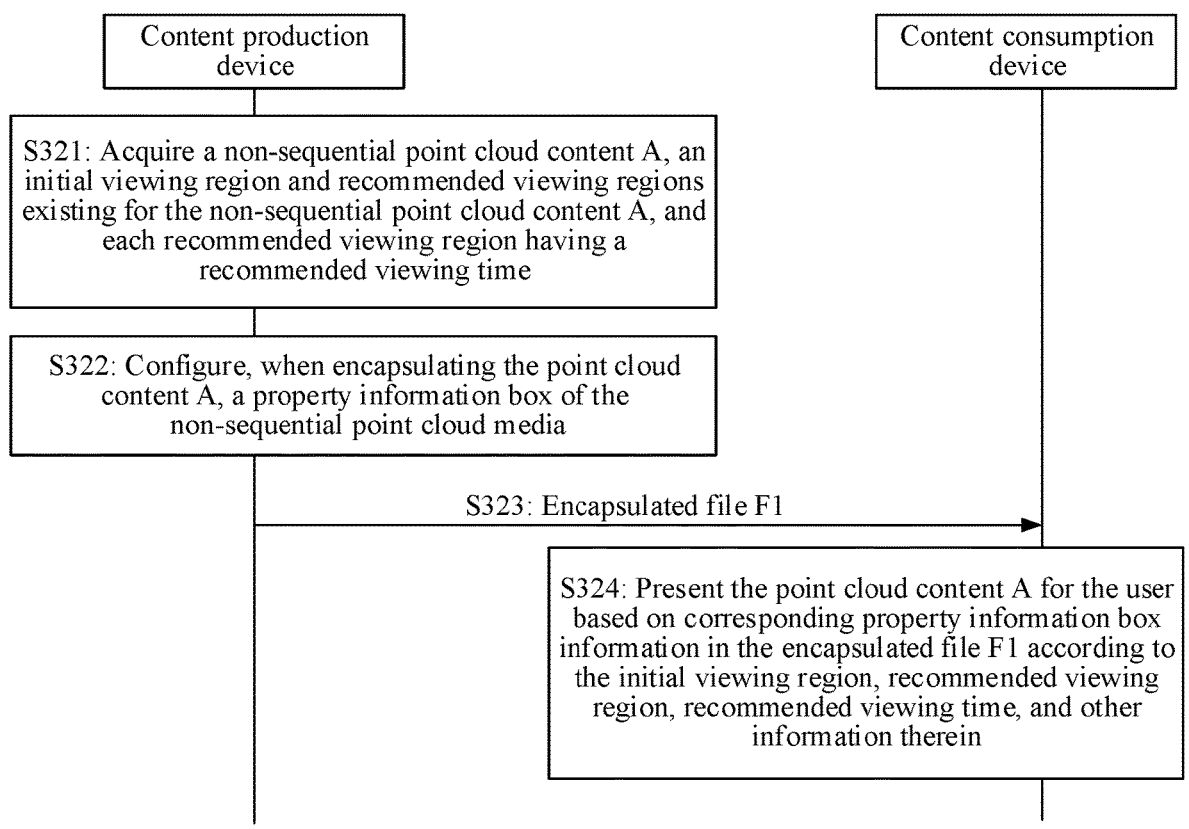

FIG. 5 is a schematic flowchart of a data processing method 320 for non-sequential point cloud media according to an embodiment of the present disclosure. The method 320 may be interactively performed by the content production device 102 and the content consumption device 101 in the embodiment shown in FIG. 1. As shown in FIG. 5, the data processing method 320 for non-sequential point cloud media may include part or all of the following contents:

S321: The content production device acquires a non-sequential point cloud content A, an initial viewing region and recommended viewing regions existing for the non-sequential point cloud content A, and each recommended viewing region having a recommended viewing time.

S322: When encapsulating the point cloud content A, the content production device configures a property information box of the point cloud content A. As an example, corresponding property information box information includes the following information:

F1:item1: RecommendedSpatialInfoProperty:
initial_region_indicated=1; recommended_region_indicated=1; presentation_duration_indicated=1;
initial_region: {3d_region_id=1001, anchor=(0,0,0), region=(100,100,100)};
recommended_region:
{3d_region_id=1001, anchor=(0,0,0), region=(100,100, 100), presentation_duration=5000}; {3d_region_id=1002, anchor=(0,100,0), region=(100,100,100), presentation_duration=5000}; {3d_region_id=1003, anchor=(0,200,0), region=(100,100,100), presentation_duration=5000}.

S323: The content production device transmits the encapsulated file F1 to the content consumption device.

S324: The content consumption device presents the point cloud content A for the user based on corresponding property information box information in the encapsulated file F1 according to the initial viewing region, recommended viewing region, recommended viewing time, and other information of the point cloud content A. That is, a region 1001 (a presentation time is 5000 ms) is presented first, a region 1002 (a presentation time is 5000 ms) is presented, and finally a region 1003 (a presentation time is 5000 ms) is presented. In a specific presentation form, the content consumption device may directly switch the screen for the user after the presentation time is reached, or may switch the screen for the user through a prompt of an application interface after the user determines to switch, which is not limited in the present disclosure.

In some embodiments, S210 may include:

receiving a dynamic adaptive streaming over HTTP (DASH) signaling message transmitted by a content production device, the signaling message including the property information of the viewing region corresponding to the non-sequential point cloud media, and the property information of the viewing region corresponding to the non-sequential point cloud media including the property information of the initial viewing region of the non-sequential point cloud media. Based on the above, in S220, an acquisition request is transmitted to the content production device based on the property information of the initial viewing region of the non-sequential point cloud media, the acquisition request carrying target description information, and the target description information being used for describing a target encapsulated file including the initial viewing region; the target encapsulated file returned according to the acquisition request by the content production device is received; and the target encapsulated file is presented based on the property information of the viewing region corresponding to the non-sequential point cloud media in the signaling message.

In some embodiments, if the first indication information indicates that the recommended viewing region exists for the non-sequential point cloud media, the property information of the viewing region in the signaling message includes property information of the recommended viewing region, and the non-sequential point cloud media in the recommended viewing region is encapsulated in the target encapsulated file. Therefore, the property information of the recommended viewing region may be determined based on the property information of the viewing region in the signaling message, and the non-sequential point cloud media located in the recommended viewing region in the target encapsulated file may be presented based on the property information of the recommended viewing region.

In some embodiments, the signaling message may be a DASH signaling message.

Figure 6:
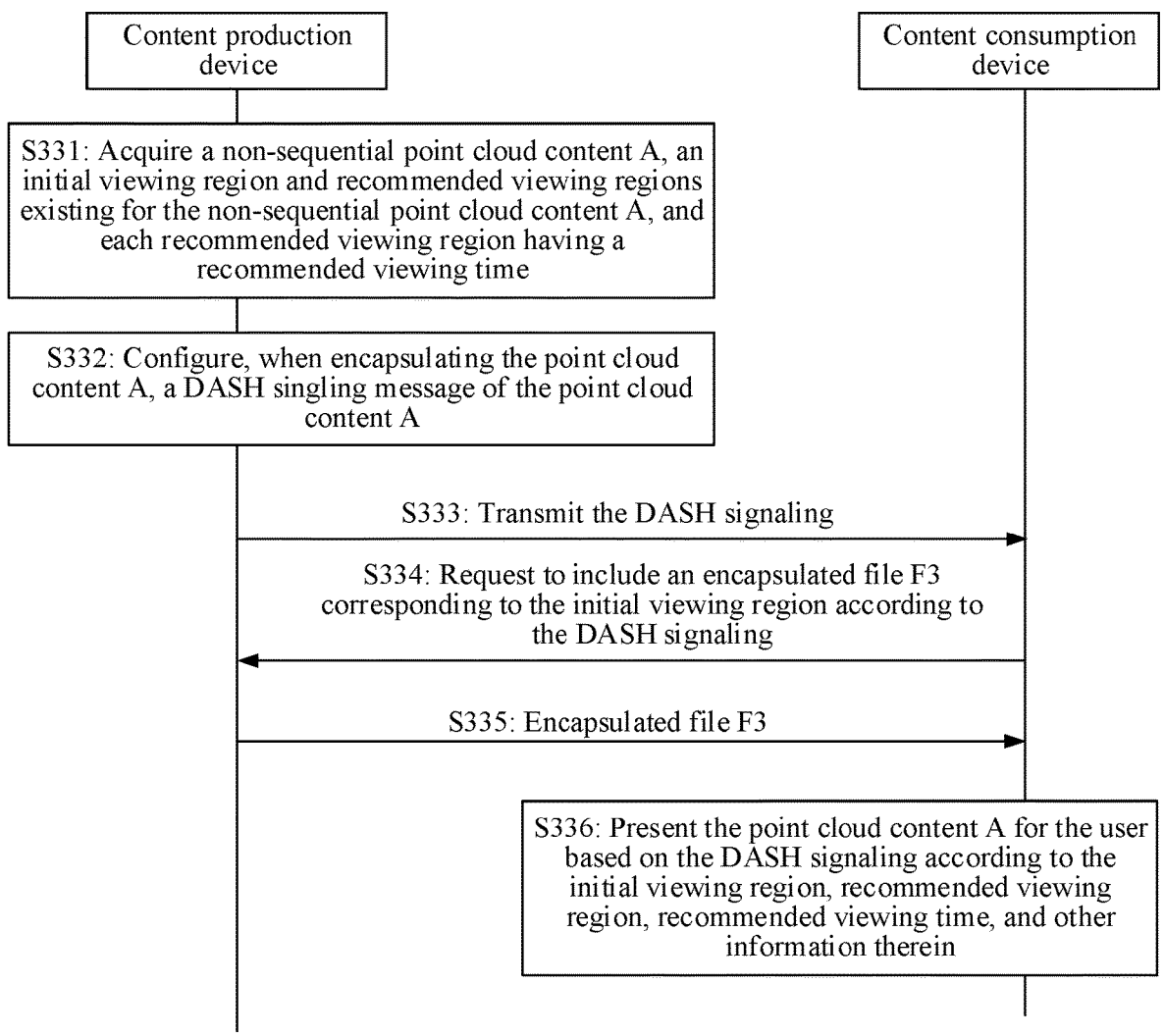

FIG. 6 is a schematic flowchart of a data processing method 330 for non-sequential point cloud media according to an embodiment of the present disclosure. The method 330 may be interactively performed by the content production device 102 and the content consumption device 101 in the embodiment shown in FIG. 1. As shown in FIG. 6, the data processing method 330 for non-sequential point cloud media may include part or all of the following contents:

S331: The content production device acquires a non-sequential point cloud content A, an initial viewing region and recommended viewing regions existing for the non-sequential point cloud content A, and each recommended viewing region having a recommended viewing time.

S332: When encapsulating the point cloud content A, the content production device configures a DASH signaling of the point cloud content A. As an example, the DASH signaling is as follows:

initialRegionIndicated=1; rcmdRegionIndicated=1; preDurationIndicated=1;
initial3DSpatialRegion: {3d_region_id=1001, anchor=(0, 0,0), region=(100,100,100)};
rcmd3DSpatialRegion:
{3d_region_id=1001, anchor=(0,0,0), region=(100,100, 100), presentation_duration=5000}; {3d_region_id=1002, anchor=(0,100,0), region=(100,100,100), presentation_duration=5000}; {3d_region_id=1003, anchor=(0,200,0), region=(100,100,100), presentation_duration=5000}.

S333: The content production device transmits the DASH signaling message to the content consumption device. Information of a relevant field in the DASH signaling corresponds to the information in the property information box. To avoid repetition, details are not described herein again.

S334: The content consumption device requests the content production device to include an encapsulated file F3 corresponding to the initial viewing region according to the DASH signaling.

S335: The content production device transmits the encapsulated file F3 to the content consumption device.

S336: The content consumption device presents the point cloud content A for the user based on the DASH signaling according to the initial viewing region, recommended viewing region, recommended viewing time, and other information of the point cloud content A. That is, a region 1001 (a presentation time is 5000 ms) is presented first, a region 1002 (a presentation time is 5000 ms) is presented, and finally a region 1003 (a presentation time is 5000 ms) is presented. In a specific presentation form, the content consumption device may directly switch the screen for the user after the presentation time is reached, or may switch the screen for the user through a prompt of an application interface after the user determines to switch, which is not limited in the present disclosure.

It is to be understood that the manner of indicating the viewing region through the three-dimensional spatial structure data is merely an example of the present disclosure, and is not to be understood as a limitation on the present disclosure. In other embodiments of the present disclosure, the initial viewing region or the recommended viewing region may alternatively be indicated in a title identifier or region identifier indication manner.

For example, in other alternative embodiments, the property information box information and/or the information included in the DASH signaling involved in the methods 310 and 320 may be replaced with the following information:

initialRegionIndicated=1; rcmdRegionIndicated=1; preDurationIndicated=1;
initial3DSpatialRegion: {initalTileIds:tile1,tile2};
rcmd3DSpatialRegion:
{rcmdTileIds:tile1,tile2,presentation_duration=5000};
{rcmdTileIds:tile3,tile4,presentation_duration=5000};
{rcmdTileIds:tile5,tile6,presentation_duration=5000}.

The content consumption device presents the point cloud media content for the user based on the information in the property information box information and/or the information in the dash signaling according to the initial viewing region, recommended viewing region, recommended viewing time, and other information therein. That is, a region corresponding to tile 1+tile 2 (a presentation time is 5000 ms) is presented first, a region corresponding to tile 3+tile 4 (a presentation time is 5000 ms) is presented, and finally a region corresponding to tile 5+tile 6 (a presentation time is 5000 ms) is presented.

Figure 7:
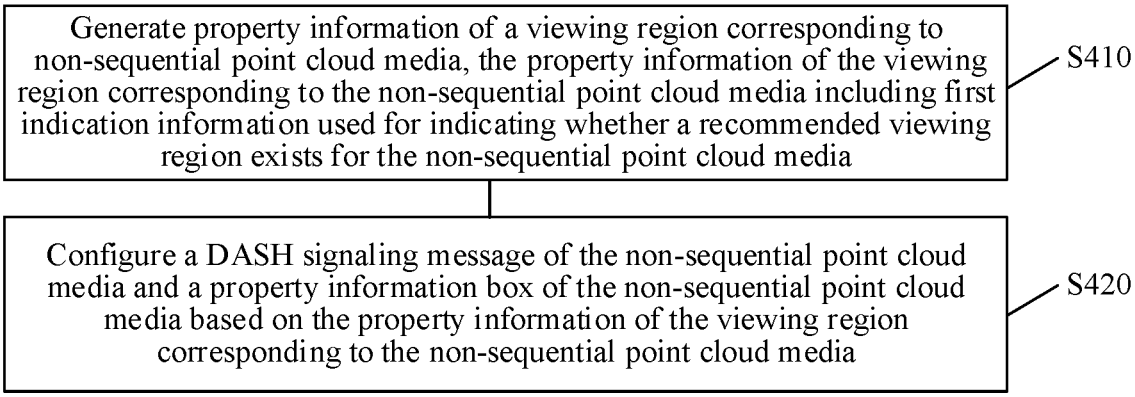

FIG. 7 is a schematic flowchart of a data processing method 400 for point cloud media according to an embodiment of the present disclosure. The method 400 may be performed by a content production device in a point cloud media system. For example, the content production device is a device with a capability of encoding point cloud media, such as a server, an unmanned aerial vehicle, or a mobile terminal.

As shown in FIG. 7, the method 200 may include the following steps.

S410: Generate property information of a viewing region corresponding to non-sequential point cloud media, the property information of the viewing region corresponding to the non-sequential point cloud media including first indication information used for indicating whether a recommended viewing region exists for the non-sequential point cloud media.

S420: Configure a DASH signaling message of the non-sequential point cloud media and a property information box of the non-sequential point cloud media based on the property information of the viewing region corresponding to the non-sequential point cloud media.

In some embodiments, if M recommended viewing regions do not exist for the non-sequential point cloud media, a value of the first indication information is a first value; and if property information of the M recommended viewing regions exists for the non-sequential point cloud media, the value of the first indication information is a second value, and M≥1. In an implementation, the property information of the viewing region corresponding to the non-sequential point cloud media includes the property information of the M recommended viewing regions. The property information of the M recommended viewing regions includes at least one of the following: three-dimensional spatial structure data corresponding to the M recommended viewing regions, a region identifier corresponding to the M recommended viewing regions, and a title identifier corresponding to the M recommended viewing regions. In an implementation, the property information of the viewing region corresponding to the non-sequential point cloud media includes the property information of the M recommended viewing regions. The property information of the viewing region corresponding to the non-sequential point cloud media further includes quantity indication information, a value of the quantity indication information being used for indicating a quantity of the M recommended viewing regions, and the quantity of the M recommended viewing regions being greater than 0.

When indicating that the recommended viewing region exists for the non-sequential point cloud media, by indicating the recommended viewing region of the non-sequential point cloud media, the client can be supported to request and consume the non-sequential point cloud media according to the recommended viewing region, which makes the transmission and consumption processes of the non-sequential point cloud media more efficient, and supports a more flexible non-sequential point cloud media presentation form.

In some embodiments, the property information of the viewing region corresponding to the non-sequential point cloud media further includes second indication information, the second indication information being used for indicating whether the property information of the viewing region corresponding to the non-sequential point cloud media includes property information of an initial viewing region. If the property information of the viewing region corresponding to the non-sequential point cloud media does not include the property information of the initial viewing region, a value of the second indication information is a third value. If the property information of the viewing region corresponding to the non-sequential point cloud media includes the property information of the initial viewing region, the value of the second indication information is a fourth value.

In some embodiments, the property information of the viewing region corresponding to the non-sequential point cloud media further includes third indication information used for indicating whether the recommended viewing region of the non-sequential point cloud media includes the initial viewing region. If the recommended viewing region of the non-sequential point cloud media does not include the initial viewing region, a value of the third indication information is a fifth value. If the recommended viewing region of the non-sequential point cloud media includes the initial viewing region, the value of the third indication information is a sixth value.

In some embodiments, the property information of the viewing region corresponding to the non-sequential point cloud media includes property information of an initial viewing region; and the property information of the initial viewing region includes at least one of the following: three-dimensional spatial structure data of the initial viewing region, a region identifier corresponding to the three-dimensional spatial structure data of the initial viewing region, and a title identifier corresponding to the three-dimensional spatial structure data of the initial viewing region.

In some embodiments, the property information of the viewing region corresponding to the non-sequential point cloud media includes property information of M recommended viewing regions. The property information of the viewing region corresponding to the non-sequential point cloud media further includes presentation duration indication information, the presentation duration indication information being used for indicating whether the property information of the viewing region corresponding to the non-sequential point cloud media includes presentation durations of the M recommended viewing regions. If the presentation duration indication information is used for indicating that the property information of the viewing region corresponding to the non-sequential point cloud media includes the presentation durations of the M recommended viewing regions, the property information of the viewing region corresponding to the non-sequential point cloud media further includes presentation duration information, a value of the presentation duration information being used for indicating the presentation duration of each recommended viewing region in the M recommended viewing regions, and M≥1.

In some embodiments, the method 400 may further include:
transmitting a DASH signaling message to a content consumption device, the DASH signaling message including the property information of the viewing region corresponding to the non-sequential point cloud media, and the property information of the viewing region corresponding to the non-sequential point cloud media including the property information of the initial viewing region of the non-sequential point cloud media; receiving an acquisition request transmitted by the content consumption device to the content production device based on the property information of the initial viewing region of the non-sequential point cloud media, the acquisition request carrying target description information, and the target description information being used for describing a target encapsulated file including the initial viewing region; and returning the target encapsulated file to the content consumption device according to the acquisition request, the target encapsulated file including a property information box of the non-sequential point cloud media, and the property information box being used for defining the property information of the viewing region corresponding to the non-sequential point cloud media.

In some embodiments, the method 400 may further include:
transmitting a target encapsulated file including the initial viewing region of the non-sequential point cloud media to a content consumption device, the target encapsulated file including a property information box of the non-sequential point cloud media, and the property information box being used for defining the property information of the viewing region corresponding to the non-sequential point cloud media.

In some embodiments, the method 400 may further include:
transmitting a DASH signaling message to a content consumption device, the DASH signaling message including the property information of the viewing region corresponding to the non-sequential point cloud media, and the property information of the viewing region corresponding to the non-sequential point cloud media including the property information of the initial viewing region of the non-sequential point cloud media; receiving an acquisition request transmitted by the content consumption device based on the property information of the initial viewing region of the non-sequential point cloud media, the acquisition request carrying target description information, and the target description information being used for describing a target encapsulated file including the initial viewing region; and receiving the target encapsulated file returned according to the acquisition request by the content production device.

It may be understood that, although the steps in the flowcharts of the embodiments are displayed sequentially according to instructions of arrows, these steps are not necessarily performed sequentially according to a sequence instructed by the arrows. Unless otherwise clearly specified in the present disclosure, the steps are performed without any strict sequence limit, and may be performed in other sequences. In addition, at least some steps in the flowcharts in the embodiments may include a plurality of steps or a plurality of stages. The steps or the stages are not necessarily performed at the same moment, but may be performed at different moments. The steps or the stages are not necessarily performed in sequence, but may be performed in turn or alternately with another step or at least some of steps or stages of the another step.

Figure 8:
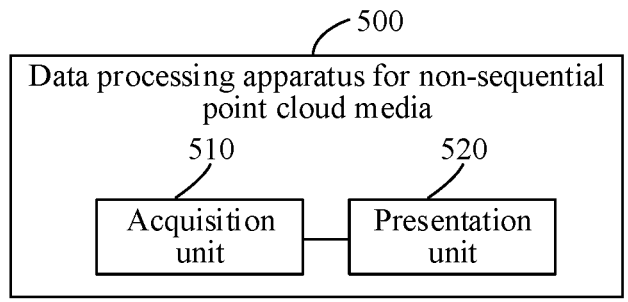
FIG. 8 and FIG. 9 are schematic block diagrams of a data processing apparatus for non-sequential point cloud media according to certain embodiment(s) of the present disclosure.

FIG. 8 is a schematic structural diagram of a data processing apparatus 500 for non-sequential point cloud media according to an embodiment of the present disclosure. The data processing apparatus 500 for non-sequential point cloud media may be configured to perform the corresponding steps in the data processing method for point cloud media shown in FIG. 3 to FIG. 6.

As shown in FIG. 8, the data processing apparatus 500 for non-sequential point cloud media may include: an acquisition unit 510, configured to acquire property information of a viewing region corresponding to non-sequential point cloud media, the property information of the viewing region corresponding to the non-sequential point cloud media including first indication information used for indicating whether a recommended viewing region exists for the non-sequential point cloud media; and a presentation unit 520, configured to present the non-sequential point cloud media based on the property information of the viewing region corresponding to the non-sequential point cloud media.

In some embodiments, if M recommended viewing regions do not exist for the non-sequential point cloud media, a value of the first indication information is a first value. If property information of the M recommended viewing regions exists for the non-sequential point cloud media, the value of the first indication information is a second value, and M≥1. In an implementation, the property information of the viewing region corresponding to the non-sequential point cloud media includes the property information of the M recommended viewing regions. The property information of the M recommended viewing regions includes at least one of the following: three-dimensional spatial structure data corresponding to the M recommended viewing regions, a region identifier corresponding to the M recommended viewing regions, and a title identifier corresponding to the M recommended viewing regions. In an implementation, the property information of the viewing region corresponding to the non-sequential point cloud media includes the property information of the M recommended viewing regions. The property information of the viewing region corresponding to the non-sequential point cloud media further includes quantity indication information, a value of the quantity indication information being used for indicating a quantity of the M recommended viewing regions, and the quantity of the M recommended viewing regions being greater than 0.

When indicating that the recommended viewing region exists for the non-sequential point cloud media, by indicating the recommended viewing region of the non-sequential point cloud media, the client can be supported to request and consume the non-sequential point cloud media according to the recommended viewing region, which makes the transmission and consumption processes of the non-sequential point cloud media more efficient, and supports a more flexible non-sequential point cloud media presentation form.

In some embodiments, the property information of the viewing region corresponding to the non-sequential point cloud media further includes second indication information, the second indication information being used for indicating whether the property information of the viewing region corresponding to the non-sequential point cloud media includes property information of an initial viewing region. If the property information of the viewing region corresponding to the non-sequential point cloud media does not include the property information of the initial viewing region, a value of the second indication information is a third value. If the property information of the viewing region corresponding to the non-sequential point cloud media includes the property information of the initial viewing region, the value of the second indication information is a fourth value.

In some embodiments, the property information of the viewing region corresponding to the non-sequential point cloud media further includes third indication information used for indicating whether the recommended viewing region of the non-sequential point cloud media includes the initial viewing region. If the recommended viewing region of the non-sequential point cloud media does not include the initial viewing region, a value of the third indication information is a fifth value. If the recommended viewing region of the non-sequential point cloud media includes the initial viewing region, the value of the third indication information is a sixth value.

In some embodiments, the property information of the viewing region corresponding to the non-sequential point cloud media includes property information of an initial viewing region; and the property information of the initial viewing region includes at least one of the following: three-dimensional spatial structure data of the initial viewing region, a region identifier corresponding to the three-dimensional spatial structure data of the initial viewing region, and a title identifier corresponding to the three-dimensional spatial structure data of the initial viewing region.

In some embodiments, the property information of the viewing region corresponding to the non-sequential point cloud media includes property information of M recommended viewing regions. The property information of the viewing region corresponding to the non-sequential point cloud media further includes presentation duration indication information, the presentation duration indication information being used for indicating whether the property information of the viewing region corresponding to the non-sequential point cloud media includes presentation durations of the M recommended viewing regions. If the presentation duration indication information is used for indicating that the property information of the viewing region corresponding to the non-sequential point cloud media includes the presentation durations of the M recommended viewing regions, the property information of the viewing region corresponding to the non-sequential point cloud media further includes presentation duration information, a value of the presentation duration information being used for indicating the presentation duration of each recommended viewing region in the M recommended viewing regions, and M≥1.

In some embodiments, In certain embodiment(s), the acquisition unit 510 is configured to: receive a dynamic adaptive streaming over HTTP (DASH) signaling message transmitted by a content production device, the DASH signaling message including the property information of the viewing region corresponding to the non-sequential point cloud media, and the property information of the viewing region corresponding to the non-sequential point cloud media including the property information of the initial viewing region of the non-sequential point cloud media; transmit an acquisition request to the content production device based on the property information of the initial viewing region of the non-sequential point cloud media, the acquisition request carrying target description information, and the target description information being used for describing a target encapsulated file including the initial viewing region; and receive the target encapsulated file returned according to the acquisition request by the content production device, the target encapsulated file including a property information box of the non-sequential point cloud media, and the property information box being used for defining the property information of the viewing region corresponding to the non-sequential point cloud media.

In certain embodiment(s), the presentation unit 520 is configured to: present the target encapsulated file based on the property information of the viewing region corresponding to the non-sequential point cloud media in the DASH signaling message and the property information of the viewing region corresponding to the non-sequential point cloud media in the property information box.

In some embodiments, the acquisition unit 510 is configured to: receive a target encapsulated file transmitted by a content production device and including the initial viewing region of the non-sequential point cloud media, the target encapsulated file including a property information box of the non-sequential point cloud media, and the property information box being used for defining the property information of the viewing region corresponding to the non-sequential point cloud media.

In certain embodiment(s), the presentation unit 520 is configured to: present the target encapsulated file based on the property information of the viewing region corresponding to the non-sequential point cloud media in the property information box.

In some embodiments, the acquisition unit 510 is configured to: receive a dynamic adaptive streaming over HTTP (DASH) signaling message transmitted by a content production device, the DASH signaling message including the property information of the viewing region corresponding to the non-sequential point cloud media, and the property information of the viewing region corresponding to the non-sequential point cloud media including the property information of the initial viewing region of the non-sequential point cloud media.

In certain embodiment(s), the presentation unit 520 is configured to: transmit an acquisition request to the content production device based on the property information of the initial viewing region of the non-sequential point cloud media, the acquisition request carrying target description information, and the target description information being used for describing a target encapsulated file including the initial viewing region; and receive the target encapsulated file returned according to the acquisition request by the content production device; and present the target encapsulated file based on the property information of the viewing region corresponding to the non-sequential point cloud media in the DASH signaling message.

Figure 9:
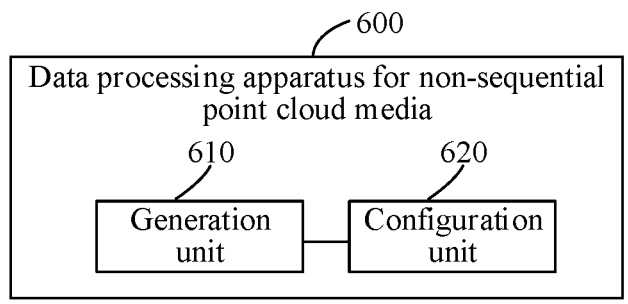

FIG. 9 is a schematic structural diagram of a data processing apparatus 600 for non-sequential point cloud media according to an embodiment of the present disclosure. The data processing apparatus 600 for non-sequential point cloud media may be configured to perform the corresponding steps in the data processing method for point cloud media shown in FIG. 4 to FIG. 7.

A generation unit 610 is configured to generate property information of a viewing region corresponding to non-sequential point cloud media, the property information of the viewing region corresponding to the non-sequential point cloud media including first indication information used for indicating whether a recommended viewing region exists for the non-sequential point cloud media.

A configuration unit is configured to configure a dynamic adaptive streaming over HTTP (DASH) signaling message of the non-sequential point cloud media and a property information box of the non-sequential point cloud media based on the property information of the viewing region corresponding to the non-sequential point cloud media.

In some embodiments, if M recommended viewing regions do not exist for the non-sequential point cloud media, a value of the first indication information is a first value. If property information of the M recommended viewing regions exists for the non-sequential point cloud media, the value of the first indication information is a second value, and M≥1. In an implementation, the property information of the viewing region corresponding to the non-sequential point cloud media includes the property information of the M recommended viewing regions. The property information of the M recommended viewing regions includes at least one of the following: three-dimensional spatial structure data corresponding to the M recommended viewing regions, a region identifier corresponding to the M recommended viewing regions, and a title identifier corresponding to the M recommended viewing regions. In an implementation, the property information of the viewing region corresponding to the non-sequential point cloud media includes the property information of the M recommended viewing regions. The property information of the viewing region corresponding to the non-sequential point cloud media further includes quantity indication information, a value of the quantity indication information being used for indicating a quantity of the M recommended viewing regions, and the quantity of the M recommended viewing regions being greater than 0.

When indicating that the recommended viewing region exists for the non-sequential point cloud media, by indicating the recommended viewing region of the non-sequential point cloud media, the client can be supported to request and consume the non-sequential point cloud media according to the recommended viewing region, which makes the transmission and consumption processes of the non-sequential point cloud media more efficient, and supports a more flexible non-sequential point cloud media presentation form.

In some embodiments, the property information of the viewing region corresponding to the non-sequential point cloud media further includes second indication information, the second indication information being used for indicating whether the property information of the viewing region corresponding to the non-sequential point cloud media includes property information of an initial viewing region. If the property information of the viewing region corresponding to the non-sequential point cloud media does not include the property information of the initial viewing region, a value of the second indication information is a third value. If the property information of the viewing region corresponding to the non-sequential point cloud media includes the property information of the initial viewing region, the value of the second indication information is a fourth value.

In some embodiments, the property information of the viewing region corresponding to the non-sequential point cloud media further includes third indication information used for indicating whether the recommended viewing region of the non-sequential point cloud media includes the initial viewing region. If the recommended viewing region of the non-sequential point cloud media does not include the initial viewing region, a value of the third indication information is a fifth value. If the recommended viewing region of the non-sequential point cloud media includes the initial viewing region, the value of the third indication information is a sixth value.

In some embodiments, the property information of the viewing region corresponding to the non-sequential point cloud media includes property information of an initial viewing region; and the property information of the initial viewing region includes at least one of the following: three-dimensional spatial structure data of the initial viewing region, a region identifier corresponding to the three-dimensional spatial structure data of the initial viewing region, and a title identifier corresponding to the three-dimensional spatial structure data of the initial viewing region.

In some embodiments, the property information of the viewing region corresponding to the non-sequential point cloud media includes property information of M recommended viewing regions. The property information of the viewing region corresponding to the non-sequential point cloud media further includes presentation duration indication information, the presentation duration indication information being used for indicating whether the property information of the viewing region corresponding to the non-sequential point cloud media includes presentation durations of the M recommended viewing regions. If the presentation duration indication information is used for indicating that the property information of the viewing region corresponding to the non-sequential point cloud media includes the presentation durations of the M recommended viewing regions, the property information of the viewing region corresponding to the non-sequential point cloud media further includes presentation duration information, a value of the presentation duration information being used for indicating the presentation duration of each recommended viewing region in the M recommended viewing regions, and M≥1.

In some embodiments, the apparatus 600 further includes a communication unit, configured to: transmit a DASH signaling message to a content consumption device, the DASH signaling message including the property information of the viewing region corresponding to the non-sequential point cloud media, and the property information of the viewing region corresponding to the non-sequential point cloud media including the property information of the initial viewing region of the non-sequential point cloud media; receive an acquisition request transmitted by the content consumption device to the content production device based on the property information of the initial viewing region of the non-sequential point cloud media, the acquisition request carrying target description information, and the target description information being used for describing a target encapsulated file including the initial viewing region; and return the target encapsulated file to the content consumption device according to the acquisition request, the target encapsulated file including a property information box of the non-sequential point cloud media, and the property information box being used for defining the property information of the viewing region corresponding to the non-sequential point cloud media.

In some embodiments, the apparatus 600 further includes a communication unit, configured to: transmit a target encapsulated file including the initial viewing region of the non-sequential point cloud media to a content consumption device, the target encapsulated file including a property information box of the non-sequential point cloud media, and the property information box being used for defining the property information of the viewing region corresponding to the non-sequential point cloud media.

In some embodiments, the apparatus 600 further includes a communication unit, configured to: transmit a DASH signaling message to a content consumption device, the DASH signaling message including the property information of the viewing region corresponding to the non-sequential point cloud media, and the property information of the viewing region corresponding to the non-sequential point cloud media including the property information of the initial viewing region of the non-sequential point cloud media; receive an acquisition request transmitted by the content consumption device based on the property information of the initial viewing region of the non-sequential point cloud media, the acquisition request carrying target description information, and the target description information being used for describing a target encapsulated file including the initial viewing region; and receive the target encapsulated file returned according to the acquisition request by the content production device.

It is to be understood that the apparatus embodiment may correspond to the method embodiment, and for similar descriptions, reference may be made to the method embodiment. To avoid repetition, details are not described herein again. In certain embodiment(s), the data processing apparatus 500 for non-sequential point cloud media may correspond to a corresponding entity in the method 200, 310, 320, or 330 in the embodiments of the present disclosure, and the units in the data processing apparatus 500 for non-sequential point cloud media are respectively configured to implement a corresponding procedure in the corresponding method. Similarly, the data processing apparatus 600 for non-sequential point cloud media may correspond to a corresponding entity in the method 310, 320, 330, or 400 in the embodiments of the present disclosure, and the units in the data processing apparatus 600 for point cloud media are respectively configured to implement a corresponding procedure in the corresponding method. For brevity, details are not described herein again.

It is to be further understood that the units of the data processing apparatus for point cloud media involved in this embodiment of the present disclosure may be separately or wholly combined into one or several other units, or one (or more) of the units may be further divided into a plurality of units having smaller functions. In this way, same operations may be implemented without affecting the implementation of the technical effects of the embodiments of the present disclosure. The units are divided based on logical functions. In an implementation, a function of one unit may be implemented by a plurality of units, or functions of a plurality of units may be implemented by one unit. In other embodiments of the present disclosure, the data processing apparatus for point cloud media may also include other units. In an implementation, the functions may also be cooperatively implemented by other units and may be cooperatively implemented by a plurality of units. According to another embodiment of the present disclosure, computer-readable instructions (including program code) that can perform the steps involved in the corresponding method may be run on a general computing device, such as a general computer, which includes processing elements and storage elements such as a central processing unit (CPU), a random access memory (RAM), and a read-only memory (ROM), to construct the data processing apparatus for point cloud media involved in this embodiment of the present disclosure and implement the data processing method for point cloud media in the embodiments of the present disclosure. The computer-readable instructions may be recorded in, for example, a computer-readable storage medium, and may be loaded into the content consumption device 101 or the content production device 102 of the data processing system for point cloud media shown in FIG. 1 through the computer-readable storage medium, and run in the content consumption device 101 or the content production device 102, to implement the corresponding method of the embodiments of the present disclosure.

In other words, the units may be implemented in a hardware form, or may be implemented by using instructions in a form of software, or may be implemented in a form of a combination of hardware and software. In certain embodiment(s), the steps in the method embodiment in the embodiments of the present disclosure may be performed by using a hardware integrated logical circuit in one or more processors and/or by using instructions in a form of software. Steps of the method disclosed with reference to the embodiments of the present disclosure may be directly performed by using one or more hardware decoding processors, or may be performed by using a combination of hardware and software in one or more decoding processors. In certain embodiment(s), the software may be located in a mature storage medium in the art, such as a random access memory, a flash memory, a read-only memory, a programmable read-only memory, an electrically erasable programmable memory, or a register. The storage medium is located in a memory. The one or more processors read information in the memory and perform the steps of the method embodiment in combination with hardware of the one or more processors.

Figure 10:
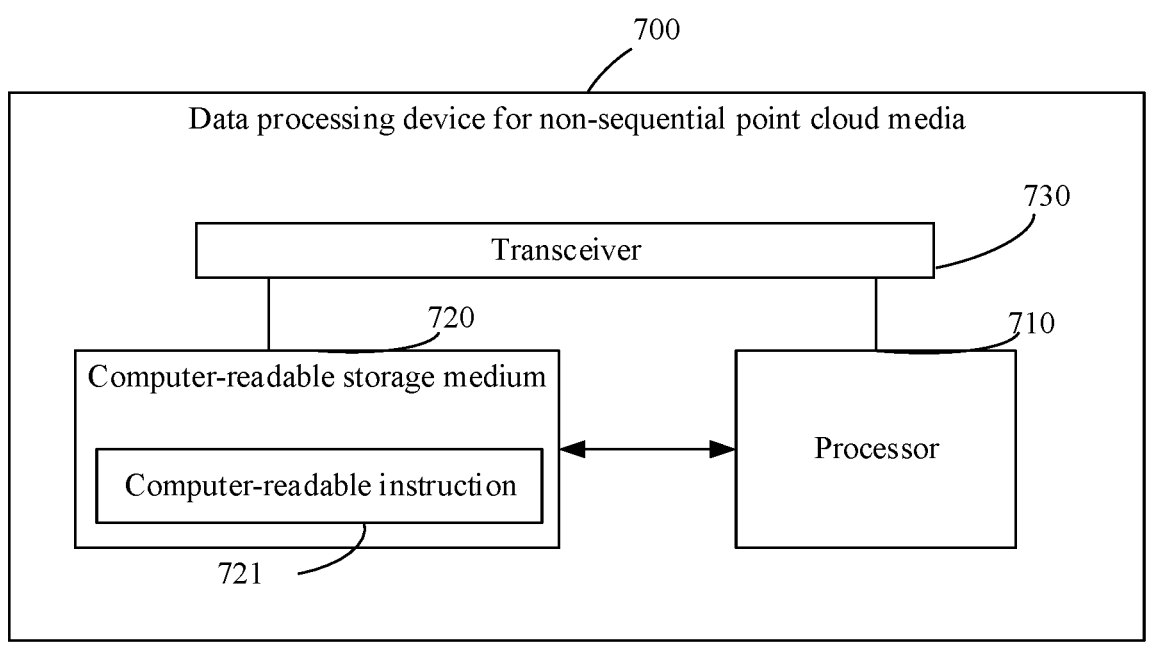
FIG. 10 is a schematic block diagram of a data processing device for non-sequential point cloud media according to certain embodiment(s) of the present disclosure.

FIG. 10 is a schematic structural diagram of a data processing device 700 for non-sequential point cloud media according to an embodiment of the present disclosure.

As shown in FIG. 10, the data processing device 700 for non-sequential point cloud media includes at least one or more processors 710 and a computer-readable storage medium 720. The one or more processors 710 and the computer-readable storage medium 720 may be connected to each other through a bus or in another manner. The computer-readable storage medium 720 is configured to store computer-readable instructions 721, and the one or more processors 710 are configured to execute the computer-readable instructions stored in the computer-readable storage medium 720. The one or more processors 710 are computing cores and control cores of the data processing device 700 for non-sequential point cloud media. The one or more processors 710 are suitable for implementing one or more computer-readable instructions, and are suitable for loading and executing the one or more computer-readable instructions to implement a corresponding method procedure or a corresponding function.

As an example, the one or more processors 710 may also be referred to as one or more central processing units (CPUs). The one or more processors 710 include but are not limited to: a general processor, a digital signal processor (DSP), an application-specific integrated circuit (ASIC), a field programmable gate array (FPGA), or another programmable logic device, a discrete gate, a transistor logic device, or a discrete hardware component.

As an example, the computer-readable storage medium 720 may be a high-speed RAM memory, or may be a non-volatile memory, such as at least one magnetic disk memory. In certain embodiment(s), the computer-readable storage medium 720 may alternatively be at least one computer-readable storage medium far away from the one or more processors 710. In certain embodiment(s), the computer-readable storage medium 720 includes, but is not limited to, a volatile memory and/or a non-volatile memory. The non-volatile memory may be a read-only memory (ROM), a programmable read-only memory (PROM), an erasable programmable read-only memory (EPROM), an electrically erasable programmable read-only memory (EEPROM) or a flash memory. The volatile memory may be a random access memory (RAM), used as an external cache. Through exemplary but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchronous link dynamic random access memory (Synch link DRAM, SLDRAM), and a direct rambus dynamic random access memory (Direct Rambus RAM, DR RAM).

In an implementation, the data processing device 700 for non-sequential point cloud media may be the content consumption device 101 in the data processing system for point cloud media shown in FIG. 1. The computer-readable storage medium 720 stores a first computer-readable instruction. The first computer-readable instruction stored in the computer-readable storage medium 720 is loaded and executed by the one or more processor 710, to implement corresponding steps in the method embodiments shown in FIG. 3 to FIG. 5. In a specific implementation, the first computer-readable instruction in the computer-readable storage medium 720 is loaded and executed by the one or more processors 710 to perform corresponding steps. To avoid repetition, details are not described herein again.

In an implementation, the data processing device 700 for non-sequential point cloud media may be the content production device 102 in the data processing system for point cloud media shown in FIG. 1. The computer-readable storage medium 720 stores a second computer-readable instruction. The second computer-readable instruction stored in the computer-readable storage medium 720 is loaded and executed by the one or more processor 710, to implement corresponding steps in the method embodiments shown in FIG. 4 and FIG. 5. In a specific implementation, the second computer-readable instruction in the computer-readable storage medium 720 is loaded and executed by the one or more processors 710 to perform corresponding steps. To avoid repetition, details are not described herein again.

According to another aspect of the present disclosure, an embodiment of the present disclosure further provides one or more computer-readable storage mediums (memory). The computer-readable storage medium is a memory device in the data processing device 700 for non-sequential point cloud media, and is configured to store programs and data. For example, the computer-readable storage medium is the computer-readable storage medium 720. It may be understood that the computer-readable storage medium 720 herein may include an internal storage medium in the data processing device 700 for non-sequential point cloud media, and may also include an extended storage medium supported by the data processing device 700 for non-sequential point cloud media. The computer-readable storage medium provides storage space, and the storage space stores an operating system of the data processing device 700 for non-sequential point cloud media. In addition, the storage space further stores one or more computer-readable instructions 721 suitable for being loaded and executed by the one or more processors 710.

According to another aspect of the present disclosure, a computer program product is provided, including computer-readable instructions, the computer-readable instructions being stored in a computer-readable storage medium. For example, the computer-readable instruction is the computer-readable instruction 721. The data processing device 700 may be a computer, the one or more processors 710 read the computer-readable instructions from the computer-readable storage medium 720, and executes the computer-readable instructions, to cause the computer to perform the method provided in the various implementations.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

In other words, when software is used to implement the embodiments, the embodiments may be implemented completely or partially in a form of a computer program product. The computer program product includes one or more computer-readable instructions. When the computer-readable instructions are loaded and executed on the computer, the procedure of the embodiments of the present disclosure is all or partially run or functions of the embodiments of the present disclosure are all or partially implemented. The computer may be a general-purpose computer, a special-purpose computer, a computer network, or another programmable apparatus. The computer-readable instructions may be stored in a computer-readable storage medium or transmitted from one computer-readable storage medium to another computer-readable storage medium. For example, the computer-readable instructions may be transmitted from one website, computer, server or data center to another website, computer, server or data center in a wired (for example, a coaxial cable, an optical fiber or a digital subscriber line (DSL)) or wireless (for example, infrared, wireless or microwave) manner.

A person of ordinary skill in the art may be aware that, the units and process steps of the examples described with reference to the embodiments disclosed in the present disclosure can be implemented in electronic hardware, or a combination of computer software and electronic hardware. Whether the functions are executed by hardware or software depends on particular applications and design constraint conditions of the technical solutions. A person skilled in the art may use different methods to implement the described functions for each particular application, but it should not be considered that the implementation goes beyond the scope of the present disclosure.

Finally, the contents are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A data processing method for non-sequential point cloud media, applied to a computing device, the method comprising:
 acquiring property information of a viewing region corresponding to non-sequential point cloud media, the property information of the viewing region corresponding to the non-sequential point cloud media including first indication information and first presentation duration indication information, the first indication information being used for indicating whether a recommended viewing region exists for the non-sequential point cloud media, and the first presentation duration indication information being used for indicating whether the property information of the viewing region includes first presentation duration information of the recommended viewing region;
 in response to a determination that the first indication information indicates that the recommended viewing region exists for the non-sequential point cloud media and the first presentation duration indication information indicates that the property information of the viewing region includes the first presentation duration information of the recommended viewing region, presenting the non-sequential point cloud media located in the recommended viewing region for a duration indicated by the first presentation duration information based on property information of the recommended viewing region included in the property information of the viewing region; and
 upon expiry of the duration, changing presented content directly or based on a user confirmation.

2. The method according to claim 1, wherein there are M existing recommended viewing regions, and M≥1; and property information of each of the recommended viewing regions includes at least one of the following: three-dimensional spatial structure data corresponding to the recommended viewing region, a region identifier corresponding to the recommended viewing region, and a title identifier corresponding to the recommended viewing region.

3. The method according to claim 1, wherein the property information of the viewing region further includes quantity indication information, a value of the quantity indication information being used for indicating a quantity of the recommended viewing regions.

4. The method according to claim 1, wherein the property information of the viewing region further includes second indication information, the second indication information being used for indicating whether the property information of the viewing region includes property information of an initial viewing region; and
 the method further comprises:
 in response to a determination that the second indication information indicates that the property information of the viewing region includes the property information of the initial viewing region, presenting the non-sequential point cloud media located in the initial viewing region according to the property information of the initial viewing region.

5. The method according to claim 1, wherein the property information of the viewing region further includes third indication information, the third indication information being used for indicating whether the recommended viewing region includes an initial viewing region of the non-sequential point cloud media; and the method further comprises:
 presenting, in response to a determination that the recommended viewing region includes the initial viewing region, the non-sequential point cloud media located in the initial viewing region based on property information of the initial viewing region; and
 presenting, after the non-sequential point cloud media located in the initial viewing region is presented and in response to a determination that a region presentation condition is satisfied, the non-sequential point cloud media located in a remaining recommended viewing region based on property information of the remaining recommended viewing region, the remaining recommended viewing region referring to recommended viewing regions in the M recommended viewing regions except the initial viewing region.

6. The method according to claim 1, wherein the property information of the viewing region includes property information of an initial viewing region of the non-sequential point cloud media; and the property information of the initial viewing region includes at least one of the following: three-dimensional spatial structure data of the initial viewing region, a region identifier corresponding to the three-dimensional spatial structure data of the initial viewing region, and a title identifier corresponding to the three-dimensional spatial structure data of the initial viewing region.

7. The method according to claim 1, wherein the property information of the viewing region includes property information of M recommended viewing regions and presentation duration indication information, the presentation duration indication information being used for indicating whether the property information of the viewing region includes presentation durations of the M recommended viewing regions; and in response to a determination that the presentation duration indication information is used for indicating that the property information of the viewing region includes the presentation durations of the M recommended viewing regions, the property information of the viewing region further includes presentation duration information, a value of the presentation duration information being used for indicating the presentation duration of each recommended viewing region in the M recommended viewing regions, and M≥1.

8. The method according to claim 7, wherein the property information of the recommended viewing region includes a region identifier of the recommended viewing region; and
presenting the non-sequential point cloud media comprises:
in response to a determination that there are a plurality of recommended viewing regions, determining a presentation order corresponding to the plurality of recommended viewing regions based on the region identifier of each of the recommended viewing regions, and presenting, according to the presentation order and the corresponding presentation duration information, the non-sequential point cloud media located in each of the recommended viewing regions based on property information of each of the recommended viewing regions.

9. The method according to claim 1, wherein acquiring the property information comprises:
receiving a dynamic adaptive streaming over HTTP (DASH) signaling message transmitted by a content production device, the signaling message including the property information of the viewing region corresponding to the non-sequential point cloud media, and the property information of the viewing region including the property information of the initial viewing region of the non-sequential point cloud media;
transmitting an acquisition request to the content production device based on the property information of the initial viewing region, the acquisition request carrying target description information, and the target description information being used for describing a target encapsulated file including the initial viewing region; and
receiving the target encapsulated file returned according to the acquisition request by the content production device, the target encapsulated file including a property information box of the non-sequential point cloud media, and the property information box being used for defining the property information of the viewing region corresponding to the non-sequential point cloud media; and
the presenting the non-sequential point cloud media located in the recommended viewing region based on property information of the recommended viewing region included in the property information of the viewing region comprises:
determining the property information of the recommended viewing region based on the property information of the viewing region in the signaling message and the property information of the viewing region in the property information box, and presenting the non-sequential point cloud media located in the recommended viewing region in the target encapsulated file based on the property information of the recommended viewing region.

10. The method according to claim 1, wherein acquiring the property information comprises:
receiving a target encapsulated file transmitted by a content production device and including the initial viewing region of the non-sequential point cloud media, the target encapsulated file including a property information box of the non-sequential point cloud media, and the property information box being used for defining the property information of the viewing region corresponding to the non-sequential point cloud media; and
presenting the non-sequential point cloud media comprises:
determining the property information of the recommended viewing region based on the property information of the viewing region in the property information box, and presenting the non-sequential point cloud media located in the recommended viewing region in the target encapsulated file based on the property information of the recommended viewing region.

11. The method according to claim 1, wherein acquiring the property information comprises:
receiving a dynamic adaptive streaming over HTTP (DASH) signaling message transmitted by a content production device, the signaling message including the property information of the viewing region corresponding to the non-sequential point cloud media, and the property information of the viewing region corresponding to the non-sequential point cloud media including the property information of the initial viewing region of the non-sequential point cloud media; and
presenting the non-sequential point cloud media comprises:
transmitting an acquisition request to the content production device based on the property information of the initial viewing region of the non-sequential point cloud media, the acquisition request carrying target description information, and the target description information being used for describing a target encapsulated file including the initial viewing region;
receiving the target encapsulated file returned according to the acquisition request by the content production device; and
determining the property information of the recommended viewing region based on the property information of the viewing region in the signaling message, and presenting the non-sequential point cloud media located in the recommended viewing region in the target encapsulated file based on the property information of the recommended viewing region.

12. The method according to claim 1, wherein:
the first indication information comprises a one-bit indication being used for indicating whether the recommended viewing region exists for the non-sequential point cloud media.

13. A data processing apparatus for non-sequential point cloud media, comprising: a memory storing computer program instructions; and a processor coupled to the memory and configured to execute the computer program instructions and perform:
acquiring property information of a viewing region corresponding to non-sequential point cloud media, the property information of the viewing region corresponding to the non-sequential point cloud media including first indication information and first presentation duration indication information, the first indication information being used for indicating whether a recommended viewing region exists for the non-sequential point cloud media, and the first presentation duration indication information being used for indicating whether the property information of the viewing region includes first presentation duration information of the recommended viewing region;
in response to a determination that the first indication information indicates that the recommended viewing region exists for the non-sequential point cloud media and the first presentation duration indication information indicates that the property information of the viewing region includes the first presentation duration information of the recommended viewing region,
presenting the non-sequential point cloud media located in the recommended viewing region for a duration indicated by the first presentation duration information based on property information of the recommended viewing region included in the property information of the viewing region; and
upon expiry of the duration, changing presented content directly or based on a user confirmation.

14. The apparatus according to claim 13, wherein there are M existing recommended viewing regions, and M≥1; and property information of each of the recommended viewing regions includes at least one of the following: three-dimensional spatial structure data corresponding to the recommended viewing region, a region identifier corresponding to the recommended viewing region, and a title identifier corresponding to the recommended viewing region.

15. The apparatus according to claim 13, wherein the property information of the viewing region further includes quantity indication information, a value of the quantity indication information being used for indicating a quantity of the recommended viewing regions.

16. The apparatus according to claim 13, wherein the property information of the viewing region further includes second indication information, the second indication information being used for indicating whether the property information of the viewing region includes property information of an initial viewing region; and
the method further includes:
in response to a determination that the second indication information indicates that the property information of the viewing region includes the property information of the initial viewing region,
presenting the non-sequential point cloud media located in the initial viewing region according to the property information of the initial viewing region.

17. The apparatus according to claim 13, wherein the property information of the viewing region further includes third indication information, the third indication information being used for indicating whether the recommended viewing region includes an initial viewing region of the non-sequential point cloud media; and the method further includes:
presenting, in response to a determination that the recommended viewing region includes the initial viewing region, the non-sequential point cloud media located in the initial viewing region based on property information of the initial viewing region; and
presenting, after the non-sequential point cloud media located in the initial viewing region is presented and in response to a determination that a region presentation condition is satisfied, the non-sequential point cloud media located in a remaining recommended viewing region based on property information of the remaining recommended viewing region, the remaining recommended viewing region referring to recommended viewing regions in the M recommended viewing regions except the initial viewing region.

18. The apparatus according to claim 13, wherein the property information of the viewing region includes property information of an initial viewing region of the non-sequential point cloud media; and the property information of the initial viewing region includes at least one of the following: three-dimensional spatial structure data of the initial viewing region, a region identifier corresponding to the three-dimensional spatial structure data of the initial viewing region, and a title identifier corresponding to the three-dimensional spatial structure data of the initial viewing region.

19. The apparatus according to claim 13, wherein the property information of the viewing region includes property information of M recommended viewing regions and presentation duration indication information, the presentation duration indication information being used for indicating whether the property information of the viewing region includes presentation durations of the M recommended viewing regions; and
in response to a determination that the presentation duration indication information is used for indicating that the property information of the viewing region includes the presentation durations of the M recommended viewing regions, the property information of the viewing region further includes presentation duration information, a value of the presentation duration information being used for indicating the presentation duration of each recommended viewing region in the M recommended viewing regions, and M≥1.

20. A non-transitory computer-readable storage medium storing computer program instructions executable by at least one processor to perform:
acquiring property information of a viewing region corresponding to non-sequential point cloud media, the property information of the viewing region corresponding to the non-sequential point cloud media including first indication information and first presentation duration indication information, the first indication information being used for indicating whether a recommended viewing region exists for the non-sequential point cloud media, and the first presentation duration indication information being used for indicating whether the property information of the viewing region includes first presentation duration information of the recommended viewing region;

in response to a determination that the first indication information indicates that the recommended viewing region exists for the non-sequential point cloud media and the first presentation duration indication information indicates that the property information of the viewing region includes the first presentation duration information of the recommended viewing region, presenting the non-sequential point cloud media located in the recommended viewing region for a duration indicated by the first presentation duration information based on property information of the recommended viewing region included in the property information of the viewing region; and upon expiry of the duration, changing presented content directly or based on a user confirmation.

\* \* \* \* \*